United States Patent [19]

Sakano

[11] Patent Number: 4,707,745
[45] Date of Patent: Nov. 17, 1987

[54] DIGITAL COPIER WITH DOCUMENT IMAGE REGION DECISION DEVICE

[75] Inventor: Yukio Sakano, Tokyo, Japan

[73] Assignee: Ricoh Company, Ltd., Tokyo, Japan

[21] Appl. No.: 811,701

[22] Filed: Dec. 20, 1985

[30] Foreign Application Priority Data

| Dec. 20, 1984 | [JP] | Japan | 59-269507 |
| Dec. 20, 1984 | [JP] | Japan | 59-269505 |
| Dec. 20, 1984 | [JP] | Japan | 59-269506 |
| Dec. 20, 1984 | [JP] | Japan | 59-269504 |
| Oct. 31, 1985 | [JP] | Japan | 60-245029 |
| Oct. 31, 1985 | [JP] | Japan | 60-245030 |
| Oct. 31, 1985 | [JP] | Japan | 60-245031 |
| Oct. 31, 1985 | [JP] | Japan | 60-245032 |
| Oct. 31, 1985 | [JP] | Japan | 60-245033 |
| Oct. 31, 1985 | [JP] | Japan | 60-245034 |
| Oct. 31, 1985 | [JP] | Japan | 60-245035 |
| Oct. 31, 1985 | [JP] | Japan | 60-245036 |

[51] Int. Cl.$^4$ .............................................. H04N 1/40
[52] U.S. Cl. ................................... 358/283; 358/298; 382/50
[58] Field of Search ............... 358/280, 282, 283, 298; 382/50

[56] References Cited

U.S. PATENT DOCUMENTS

| 4,447,830 | 5/1984 | Stoffel | 358/283 |
| 4,547,811 | 10/1985 | Ochi et al. | 358/280 |
| 4,577,235 | 3/1986 | Kannapell et al. | 358/283 |

Primary Examiner—Edward L. Coles, Sr.
Attorney, Agent, or Firm—Cooper, Dunham, Griffin & Moran

[57] ABSTRACT

A digital copier for reproducing images carried in a document by converting them to an electrical binary or recording/non-recording signal and recording the binary signal. The copier includes a halftone image processor unit for generating a binary signal associated with a halftone image included in the scanned document images, and a binarizer unit for generating a binary signal associated with a two-level image included in the document images. The copier also includes an image region decision unit for determining to which one of a halftone image region and a two-level image region a pixel of a document image which is to be read belongs. The decision is made using binary data which is produced by processing the scanned image data with respect to a threshold level different from a threshold level adapted for simple binarization. Edges of the decided halftone image are processed in an optimum manner.

48 Claims, 27 Drawing Figures

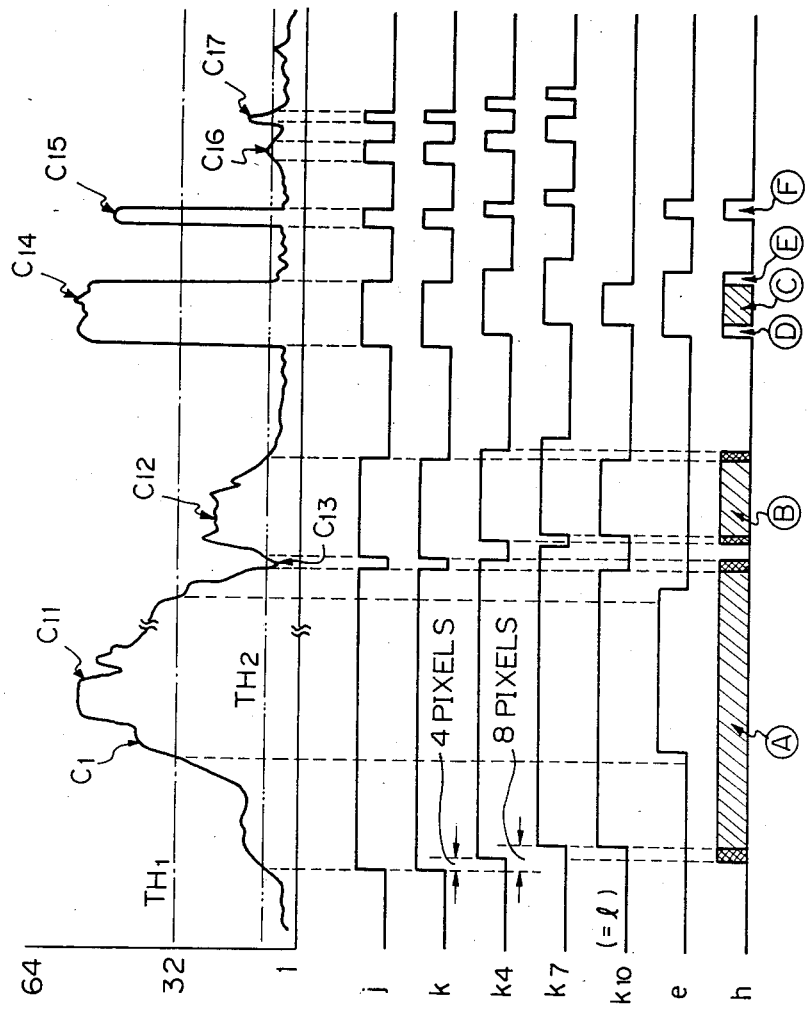

10 %

30 %

50 %

| | x | | | | | | | | | | | | | | | |
|---|---|---|---|---|---|---|---|---|---|---|---|---|---|---|---|---|
| y | 1 | 2 | 3 | 4 | 5 | 6 | 7 | 8 | 9 | 10 | 11 | 12 | 13 | 14 | 15 | 16 |
| 1 | 0 | 0 | 0 | 0 | 0 | 0 | 0 | 1 | 1 | 0 | 0 | 1 | 1 | 0 | 0 | 0 |
| 2 | 0 | 0 | 1 | 1 | 0 | 0 | 1 | 0 | 0 | 0 | 0 | 0 | 0 | 0 | 0 | 1 |
| 3 | 1 | 0 | 0 | 0 | 0 | 1 | 0 | 0 | 0 | 1 | 0 | 0 | 0 | 1 | 0 | 0 |
| 4 | 1 | 0 | 0 | 1 | 0 | 0 | 0 | 1 | 0 | 0 | 0 | 0 | 0 | 1 | 0 | 0 |
| 5 | 0 | 0 | 0 | 0 | 0 | 0 | 0 | 1 | 0 | 0 | 1 | 0 | 0 | 0 | 0 | 0 |
| 6 | 0 | 1 | 1 | 0 | 0 | 0 | 1 | 0 | 0 | 0 | 0 | 0 | 0 | 0 | 0 | 1 |
| 7 | 0 | 0 | 0 | 0 | 0 | 0 | 1 | 0 | 0 | 1 | 1 | 0 | 0 | 1 | 1 | 0 |
| 8 | 1 | 0 | 0 | 1 | 1 | 0 | 0 | 0 | 0 | 0 | 0 | 0 | 0 | 1 | 0 | 0 |
| 9 | 0 | 0 | 0 | 0 | 0 | 0 | 1 | 1 | 0 | 0 | 1 | 1 | 0 | 0 | 0 | 0 |
| 10 | 0 | 1 | 0 | 0 | 0 | 1 | 0 | 0 | 0 | 0 | 0 | 0 | 0 | 0 | 1 | 0 |
| 11 | 0 | 0 | 0 | 0 | 0 | 1 | 0 | 0 | 0 | 1 | 0 | 0 | 0 | 1 | 0 | 0 |
| 12 | 0 | 0 | 0 | 1 | 0 | 0 | 0 | 1 | 0 | 0 | 0 | 0 | 1 | 0 | 0 | 0 |
| 13 | 0 | 0 | 0 | 0 | 0 | 0 | 1 | 0 | 0 | 0 | 1 | 0 | 0 | 0 | 1 | 0 |
| 14 | 1 | 1 | 0 | 0 | 0 | 1 | 0 | 0 | 0 | 0 | 0 | 0 | 0 | 0 | 1 | 0 |
| 15 | 0 | 0 | 0 | 0 | 0 | 1 | 0 | 0 | 1 | 1 | 0 | 0 | 1 | 1 | 0 | 0 |

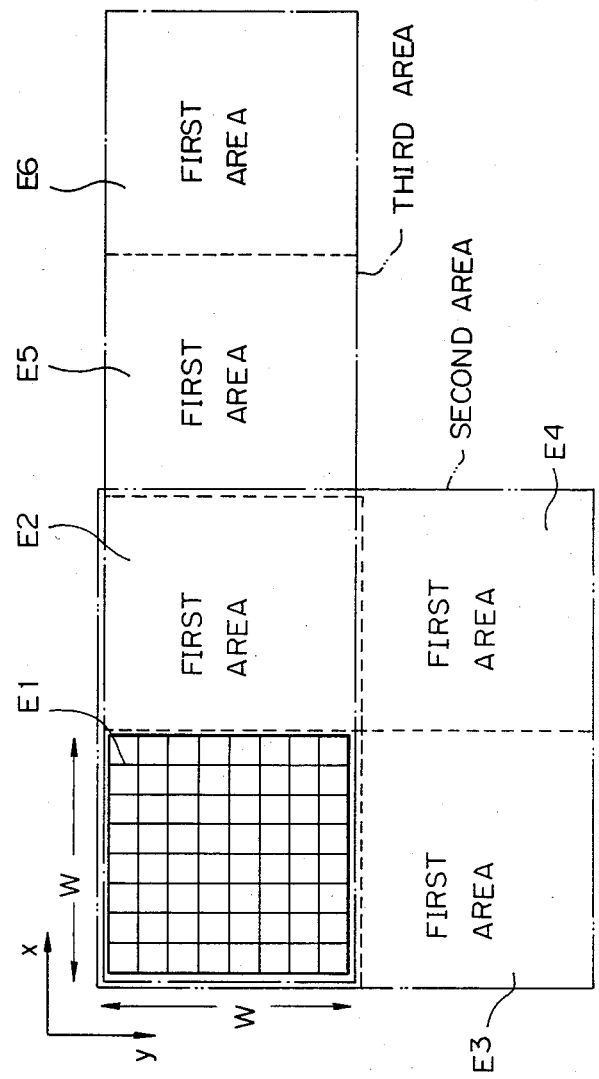

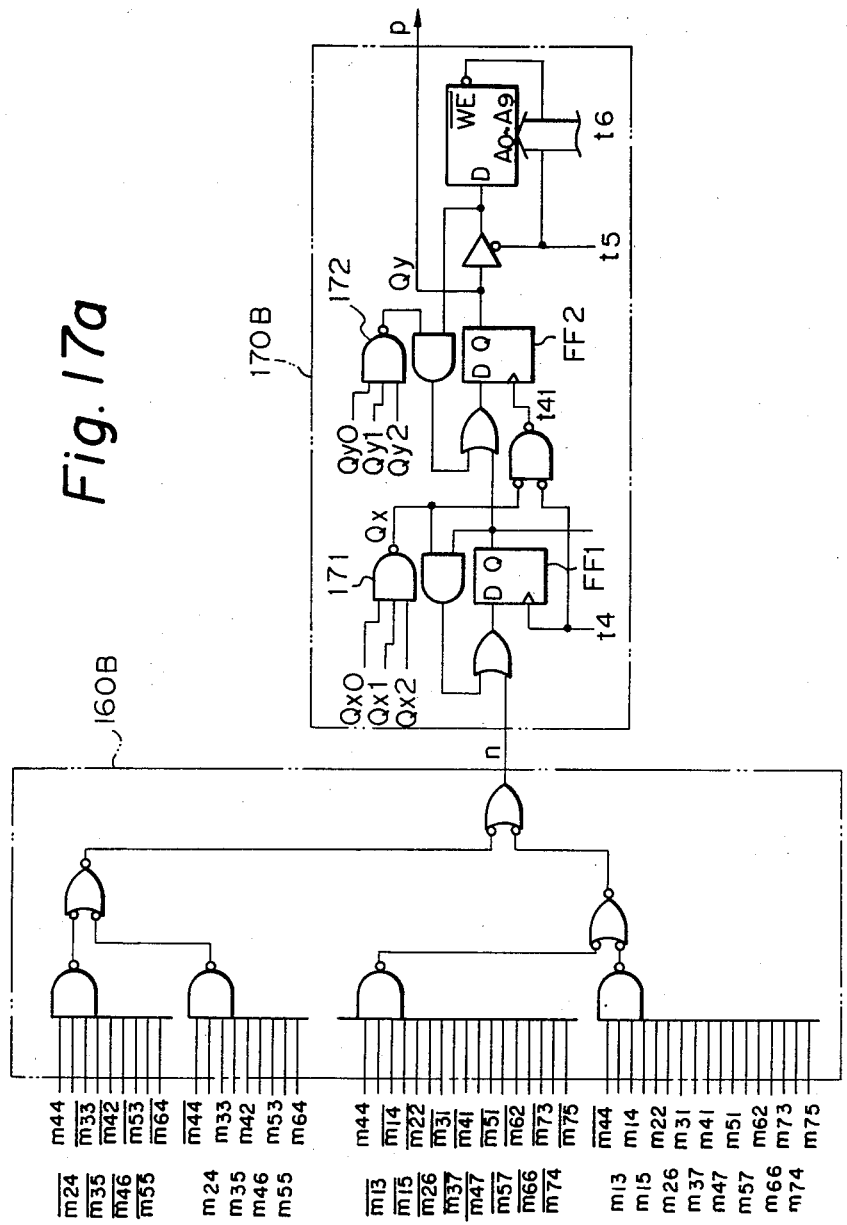

DIGITAL COPIER WITH DOCUMENT IMAGE REGION DECISION DEVICE

BACKGROUND OF THE INVENTION

The present invention relates to a digital copier and, more particularly, to a digital copier equipped with a binarizer for binarizing images of a document, which is scanned by a scanner, after deciding whether regions containing the images are character, symbol, figure and like image regions which need only simple binarization or photograph and like image regions which require halftone processing.

Generally, a digital copier uses a scanner which is implemented with a charge coupled device (CCD) image sensor. The scanner reads images of a document for each narrow region, i.e., on a pixel basis to produce analog image information. The analog image information is quantized with respect to mutiple levels and then converted to a digital signal. After being subjected to various kinds of processing, the digital signal is applied to a recorder of the copier to reproduce the document images.

In a copier of the type described, it is difficult to change the density level pixel by pixel while copying document images. To enhance reproducibility of images, it has been customary to binarize image information with respect to recording/non-recording, depending upon the characteristic of document images. However, since documents often carry photographs and others which need halftone processing (hereinafter referred to as halftone images) as well as characters, symbols, figures and others which need only simple binarization (hereinafter referred to as two-level images), it is also necessary to enhance reproducibility of halftone images. Various approaches such as a dither method, a density pattern method and a submatrix method have heretofore been proposed for rendering halftones. The problem with those approaches is that although photographs (halftone images) and others having slowly changing image densities can be favorably reproduced, characters (two-level images) and others having densities which assume any of two definite levels become illegible due to blurring which occur at their contours when reproduced and, in addition, unnoticeable contaminations in the background of a document sharply appear in copies. Such deteriorates the quality of reproduced images to a critical extent. Specifically, where a document carries both of two-level images and halftone images, simple processing all of them using two definite levels causes the halftone images to loose the gradations and, thereby, reproduces only inferior quality images, while halftone-processing all of them results in two-level images with blurred contours because two-level images are also subjected to halftone-processing.

To attain images of superior quality, therefore, it is desirable that two-level images be processed using simple two levels, while halftone images be subjected to halftone-processing as distinguished from the simple two-level or binary processing. Selection of simple binary processing and halftone processing has heretofore been implemented with a switch which is manipulatable depending upon the kind of a document, that is, presence/absence of halftone images which is decided by an operator, or logics for image recognition which uses a predetermined algorithm associated with characteristics of document images. Although this kind of implementation may be practiced relying on either software or hardware, software consumes a substantial period of time in recognizing images and, thereby, makes real-time image reproduction which is synchronous with the operation of a scanner impossible, while hardware, although shortening the processing time, results in a complicated construction.

Another approach to selectively execute the simple binary processing and the halftone processing known in the art is marks which are provided in document images in order to discriminate two-level images and halftone images, the two kinds of processing being switched from one to the other by sensing the marks during scanning. However, the mark scheme is undesirable from the operationability standpoint.

Another problem with the described type of copier is that where a line sensor or the like is used to read images pixel by pixel and if the density variation in a document is periodic, the period (pitch) often interferes with the pitches of arrangement of the sensor (sampling period) to develop moire in reproduced images. For example, where images are mesh-printed in a document, the periodic variation of the image density is apt to interfere with the sampling period of the sensor to develop moire. Assuming that the resolution of the sensor is 16 pixels per millimeter, moire often develops in a sensor output when the mesh-printing has a density close to the resolution of the sensor, i.e. 133 lines (about 10.5 pixels per millimeter) to 200 lines (about 16 pixels per millimeter). Although moire naturally occurs with other densities, too, its frequency is especially great when the density lies in the above-mentioned particular range, causing the signal to fluctuate over a significant range.

Mesh-printing itself is a kind of pseudo-halftone representation in which the pixel-by-pixel density variation occurs with two definite levels, i.e. ONEs (recording) and ZEROs (non-recording). In mesh-printing, the pitches and/or size of dots is variable to change the average density in multiple levels as a whole, thereby rendering halftone densities. Hence, disregarding the moire problem, a favorable reproduction of a mesh-printed document is attainable by processing a signal with respect to two levels. In practice, however, since moire cannot be eliminated when it comes to document images which are mesh-printed with the particular densities, the reproduction quality is critically lowered.

Meanwhile, where a sensor output representative of images is converted to a two-level or binary signal after halftone processing, reproduced images are free from or less affected by moire due to averaging of densities of a plurality of pixels, variation of a threshold level, and other operations included in the halftone processing. In this case, while the densities of images are provided in pseudo-halftone representation by dots, a mesh in a copy is not a direct reproduction of a mesh in a document but a mesh generated by halftone-processing which is particular to a copier. Therefore, where a document carries mesh-printed images or images which were reproduced by a copier using mesh-processing, it is preferable to select a copy mode which involves halftone processing despite that the pixels of the document images have two levels.

To prevent a particular part of a document from being reproduced in a copy as is often desired, customarily a white sheet is cut to produce a piece which is equal in size to the particular part of the document and, then, the white piece is bonded to the document to conceal the desired part. However, such a procedure is time- and labor-consuming. Moreover, the borders between the document and the white patch are often shadowed and appear in a copy as black lines, resulting in the need for an eraser for erasing the lines.

In a situation where characters, figures and others are printed in bold lines, one may desire to reproduce them as hollow images leaving their contours only, i.e. deleting their insides. In the image processing art, a technique is known which provides such a special image by preparing a blurred image and a sharp image and then providing exclusive-OR of the two different images by use of optical or electrical processing. Such processing, however, brings about various undesirable occurrences such as blurring, rounding of corners of images, and damaging small images.

Another known method available for producing hollow images as described above is binarizing an image signal using two different threshold levels and, then, providing exclusive-OR of the resulting binary image signals. This method, however, has the drawbacks that the line breadth is apt to become uneven, that the images become fat, and so on.

SUMMARY OF THE INVENTION

It is therefore an object of the present invention to optimumly process with two definite levels even a document in which two-level images and halftone images are printed together in conformity to the characteristic of each of the two different kinds of images, by discriminating them on a real time basis.

It is another object of the present invention to eliminate moire in the case where a document carries images in which halftones are rendered in meshes.

It is another object of the present invention to eliminate the previously discussed drawbacks inherent in the special kinds of image processing such as a one for reproducing hollowed images.

It is another object of the present invention to provide a digital copier which is operable in various modes to produce attractive copies regardless of the kind of a document.

It is another object of the present invention to provide a generally improved digital copier.

In one aspect of the present invention, there is provided a device for deciding a particular kind of image region to which a pixel of a document image to be processed belongs, comprising a binarizer for binarizing multi-level quantized digital image information associated with the document image using a second threshold level which is different from a first threshold level for simple binarization, a shifter for shifting the binarized data by a predetermined number of pixels in at least one of a main scanning and a subscanning directions in which a document is scanned, an AND gate for providing AND of the shifted data and the binarized data, and a decision circuit for deciding responsive to the AND a particular image region to which a pixel of a document image to be processed belongs.

In another aspect of the present invention, there is provided a digital copier for reproducing an image carried in a document by converting the document image to an electrical binary or recording/non-recording signal and recording the signal, comprising an image reader for scanning the document image to produce an electrical signal representative of an image density for each of small regions of the image, a halftone processor for processing the electrical output signal of the image reader to produce a binary signal associated with a halftone image which corresponds to a level of the electrical signal, a binarizer for processing the electrical output signal of the image reader to compare a level of the electrical signal and a predetermined fixed reference level and produce a binary signal which is associated with a relationship between the two compared levels, an image region decision circuit for processing the electrical output signal of the image reader to decide whether the document image includes a halftone image region, a recorder for recording binary data on a predetermined recording medium responsive to an electrical signal which is applied thereto, and a control for applying to the recorder an output signal of the halftone processor when the image region decision circuit decides that a halftone image region is present and an output signal of the binarizer when the image region decision circuit decides that a halftone image region is absent.

In another aspect of the present invention, there is provided a digital copier for reproducing an image carried in a document by converting the image to an electrical binary or recording/non-recording signal and recording the signal, comprising an image reader for scanning the document image to produce an electrical signal for each of small regions of the image which is associated with an image density of the region, a halftone processor for processing the electrical output signal of the image reader to produce a binary signal associated with a halftone image which corresponds to a level of the electrical signal, a binarizer for processing the electrical output signal of the image reader to compare a level of the electrical signal with a predetermined fixed reference level and produce a binary signal representative of a relation between the two compared levels, an image region decision circuit having a first decision section for deciding whether the document image includes a halftone image region responsive to a binary signal which is produced by deciding a level of the electrical output signal of the image reader with respect to a first threshold level, and a second decision section for deciding whether the document image includes a halftone image region responsive to a binary signal which is produced by deciding a level of the electrical output signal of the image reader with respect to a second threshold level, a recorder for recording binary data in a predetermined recording medium responsive to an electrical signal applied thereto, and a control for applying one of an output signal of the halftone processor, an output signal of the binarizer and a signal having a predetermined level to the recorder responsive to a result of decision made by the image region decision circuit.

In another aspect of the present invention, there is provided a digital copier for reproducing an image carried in a document by converting the image to an electrical binary or recording/non-recording signal and recording the signal, comprising an image reader for scanning the document image to produce an electrical signal for each of small regions of the image which is associated with an image density of the small region, a halftone processor for processing the electrical output signal of the image reader to produce a binary signal associated with a halftone image which is associated with a level of the electrical signal, a binarizer for processing the electrical output signal of the image reader to compare a level of the signal with a predetermined fixed reference level and produce a binary signal representative of a relationship between the two compared levels, an image region decision circuit for processing the electrical output signal of the image reader to decide whether the document image includes a halftone image region, a recorder for recording binary data in a predetermined recording medium responsive to an electrical signal applied thereto, an operation mode selector for selecting a desired operation mode, and a control for selecting one of an output signal of the halftone processor and an output of the binarizer depending upon an operation mode selected by the operation selector and applying the selected signal to the recorder.

The above and other objects, features and advantages of the present invention will become more apparent from the following detailed description taken with the accompanying drawings.

BRIEF DESCRIPTION OF THE DRAWINGS

FIGS. 6a and 6b are timing charts demonstrating the operation of the subsection shown in FIG. 5;

FIG. 12a is a plan view showing a part of a mesh-printed image;

FIG. 12b is a plan view representative of binary signals which are produced by reading the image of FIG. 12a;

FIG. 13 is a plan view showing arrangements of a first area, a second area and a third area which the first decision subsection assumes;

FIG. 16b is a plan view of images which may be reproduced using the document of FIG. 16a;

FIG. 17a is a block diagram showing modifications to the mesh detector and the first area detector; and FIG. 17b is a timing chart demonstrating the operation of the first area detector of FIG. 17a.

DESCRIPTION OF THE PREFERRED EMBODIMENTS

While the digital copier with a document image region decision device of the present invention is susceptible of numerous physical embodiments, depending upon the environment and requirements of use, substantial numbers of the herein shown and described embodiments have been made, tested and used, and all have performed in an eminently satisfactory manner.

Figure 1:
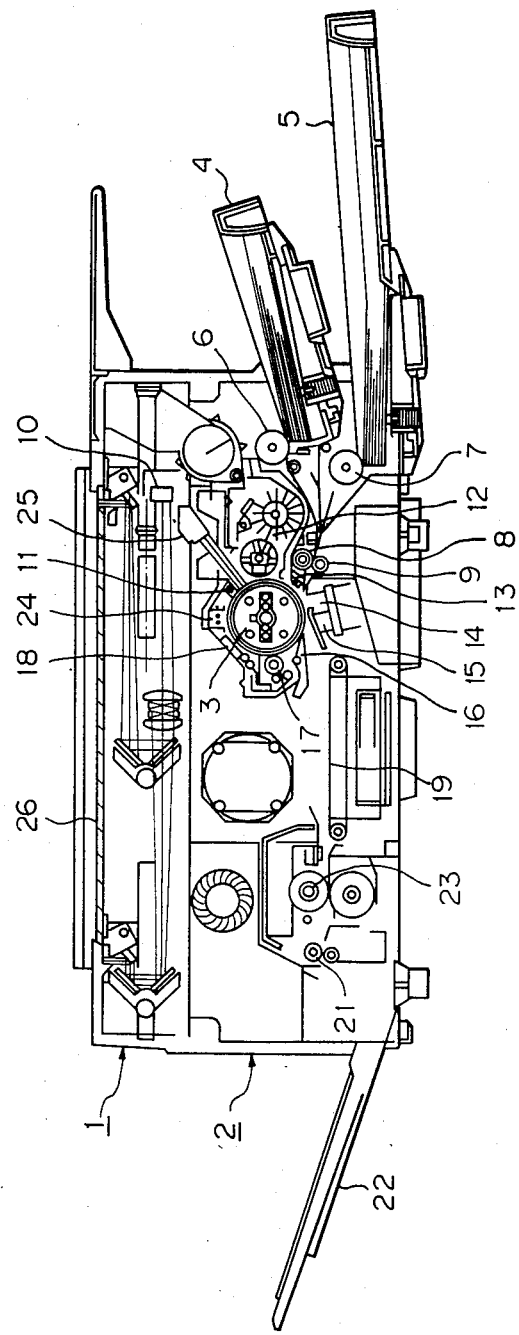
FIG. 1 is a sectional side elevation of a mechanical arrangement of a digital copier to which the present invention is applied.

Referring to FIG. 1 of the drawings, a digital copier to which the present invention is applied is shown. The copier generally comprises a scanner 1 installed in an upper portion of the copier, and a printer 2 installed in a lower portion of the same. The scanner 1 reads images carried in a document which is laid on a glass platen 26, while scanning the document. Subscanning is effected mechanically, that is, an electric motor drives a carriage which is included in the scanner 1 in the right-left direction as viewed in FIG. 1. Light reflected by the document is focused by various mirrors and lenses onto an image sensor 10, which is fixed in place. The image sensor 10 which comprises a CCD line sensor is provided with numerous photosensitive cells which are arranged one after another in a direction perpendicular to the sheet surface of FIG. 1. In this example, when the magnification is 1.0, the resolution is sixteen pixels per millimeter. Main scanning is electrically effected by a CCD shift register which is built in the image sensor 10. The main scanning direction is parallel to the direction of arrangement of the photosensitive cells, i.e. a direction perpendicular to the sheet surface of FIG. 1.

A signal representative of images which are read by the scanner 1 is applied to the printer 2 after being subjected to various kinds of processing, as will be described. The printer 2 performs two-level recording responsive to the input signal. Installed in the printer 2 are a laser write unit 25, a photoconductive drum 3, a charger 24, a developing unit 12, a transfer charger 14, a separation charger 15, a fixing unit 23, and others. The printer 2 is essentially the same as an ordinary laser printer known in the art and, for this reason, only the operation thereof will be outlined hereinafter.

The drum 3 is rotatable clockwise as viewed in FIG. 1. The charger 24 uniformly charges the surface of the rotating drum 3 to a high potential. A laser beam which has been modulated by a binary signal representative of images is focused onto the charged drum surface. The laser beam repeatedly scans the drum 3 in the main scanning direction manipulated by mechanical means. The potential on the charged surface of the drum 3 varies when illuminated by the laser beam with the result that a potential distribution associated with the images is developed on the surface of the drum 3. This potential distribution constitutes electrostatic latent images. As the latent images move through the developing unit 12, toner particles are applied to the latent images in conformity to the potentials so as to provide toner images. The toner images are transferred by the transfer charger 14 to a paper which is fed from a paper cassette 4 or 5. The paper with the toner images is discharged to a tray 22 by way of the fixing unit 23.

Figure 2:
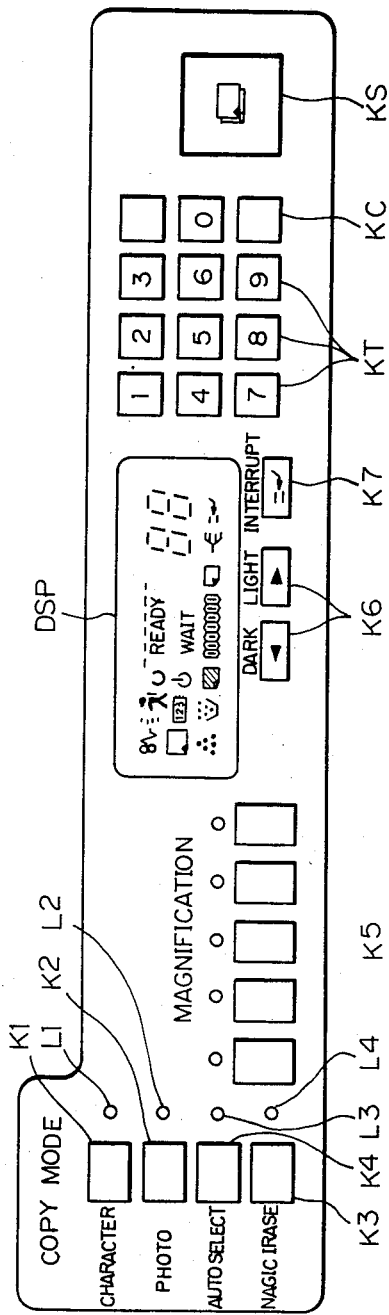
FIG. 2 is a plan view of a control panel mounted on the digital copier of FIG. 1.

Referring to FIG. 2, control panel included in the digital copier is shown. The control panel, like that of an ordinary copier, has magnify keys K5, density keys K6, an interrupt key K7, ten keys KT, a clear/stop key KC, a print start key KS, a display DSP, etc. In the illustrative arrangement, the control panel also includes a copy mode selection section. Arranged in this special section are four mode keys K1, K2, K3 and K4 and display lamps (light emitting diodes) L1, L2, L3 and L4 adapted to represent a current operation mode.

The mode key K1 is assigned to a character mode. When the mode key K1 is depressed to select a character mode, all the images are processed with respect to two definite levels. Specifically, those images in a document having densities lower than a certain threshold level are regarded as white (non-recording) pixels, the others being regarded as recording pixels. The images scanned and the images recorded have one-to-one correspondence to each other. Hence, the resolution is high enough for characters and other halftone-free images to be reproduced with superior quality. The mode key K2 is adapted to select a photograph mode. When a photograph mode is selected, images are processed as halftone images which contain halftone information so that the density level information associated with a document is reflected by reproduced images. Since the printer 2 in this example cannot print out information but with two levels (recording/non-recording) concerning each recording pixel, special halftone processing is performed to convert a multi-level signal to a two-level signal. While the halftone processing may be implemented with any of the previously mentioned dither method, density pattern method, submatrix method and others known in the art, the submatrix method is used in this particular example. In the photograph mode, although favorable images are reproducible using photographs and other multi-level or halftone images, the resolution is lowered due to the halftone processing and, therefore, such a mode is unfeasible for the reproduction of characters and like two-level images.

The mode key K3 is adapted to select an automatic selection mode. In this particular operation mode, whether each image in a document is a halftone image is automatically decided based on an image signal outputted from the scanner 1 and, then, either one of the simple binary processing and the halftone processing is selected. For example, where a document carries a photograph or like halftone image and characters or like halftone-free two-level images, the automatic selection mode adopts the halftone processing for the photograph and the simple binary processing for the characters during the course of readout. In this mode, therefore, a photograph is reproduced in a copy as an image carrying halftone information, while characters are recorded with a high resolution. The mode key K4 is assigned to a magic erase mode in which may be selected to reproduce relatively bold lines and the like as hollow images which have contours only. Further, where a certain pattern in a document is smeared out in a light color by means of a felt pen, for example, the magic erase mode will prevent that pattern from appearing in a copy. Details of the magic erase mode will be described later in detail.

Figure 3:
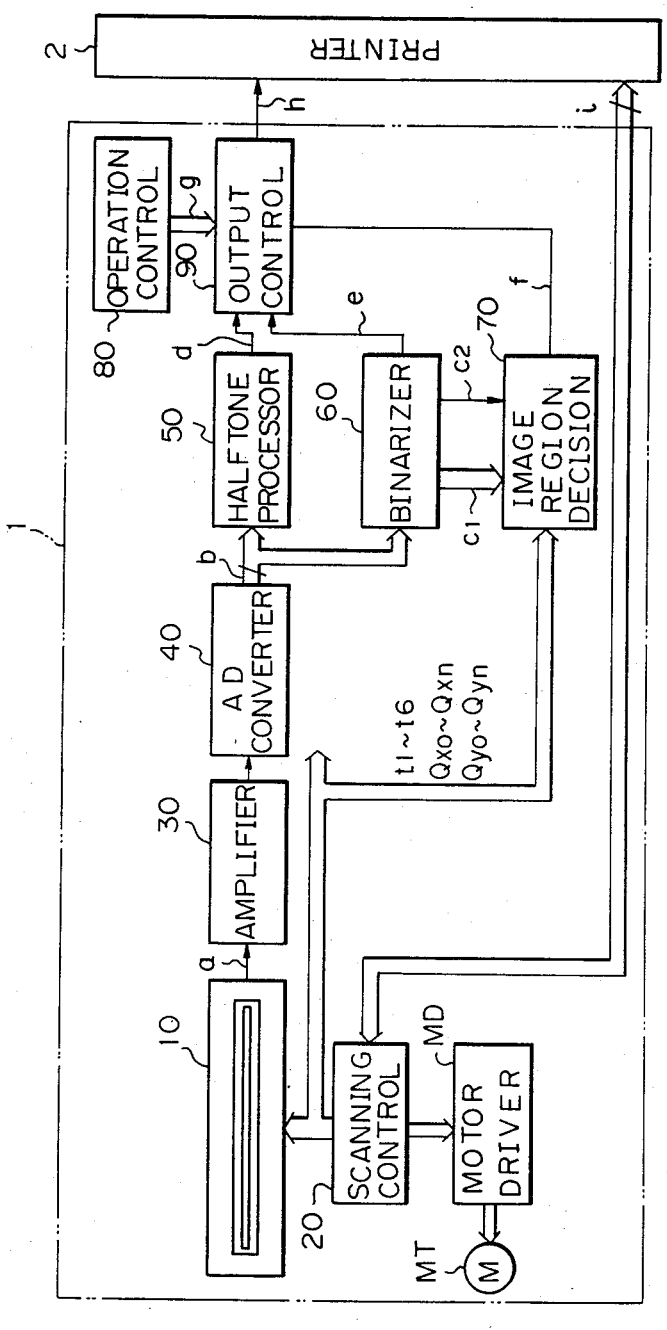
FIG. 3 is a block diagram showing an electric circuit arrangement built in the copier of FIG. 1.

Referring to FIG. 3, an electric circuit arrangement installed in the copier of FIG. 1 is shown. As shown, the scanner 1 comprises an image sensor 10, a scanning control section 20, an amplifier 30, an analog-to-digital (AD) converter 40, a halftone processing section 50, a binary processing section 60, an image region decision section 70, an operation control section 80, an output control section 90, a motor driver MD, and others.

The scanning control section 20 fulfills the roles of exchanging signals with the printer 2, controlling the main scanning and subscanning, and generating various timing signals in synchronism with scanning timings. Key readout controls except for copy mode selection and display control are effected at the printer 2 side. Various status signals, a print start signal, a magnification signal and others are delivered from the printer 2 to the scanning control 20. The scanning control 20 in turn applies scan synchronizing signals, status signals and others to the printer 2. A motor MT is driven to mechanically move the scanner 1 in the subscanning direction.

The image sensor 10, like an ordinary CCD line sensor, comprises a great number of photosensitive cells, a CCD shift register, etc. As the scanning control 20 produces a subscan synchronizing signal, signals stored in the cells of the image sensor 10 are transferred at a time to respective bits of the CCD shift register. Thereafter, responsive to a main scan pulse signal, the image signals in the CCD shift register are shifted to appear as a serial signal one pixel at a time at an output terminal of the shift register (as designated by the character a in FIG. 3; hereinafter signals derived from image signals will be parenthesized).

The amplifier 30 functions to amplify the serial image signal (a), and remove noise, while fulfilling other roles.

The AD converter 40 is adapted to convert an analog video signal to a six-bit, or sixty-four-tone digital signal (b). Although not shown, the signal (b) outputted by the A/D converter 40 has undergone various kinds of image processing such as shading compensation, background removal and white-black conversion. The digital image signal (b) is applied to the halftone processor 50 and the binary processor 60.

The halftone processor 50 serves to convert by the submatrix method the six-bit digital image signal (b) to a binary signal (d) which carries halftone information. Since a circuitry for halftone-processing which relies on the submatrix system is known in the art and since no special circuit is used in the illustrative example, details of the construction and operation of such a circuit will not be described. The submatrix method for halftone-processing may be replaced by the dither method or the density pattern method, if desired.

The binary processor 60 MTF-compensates the digital image signal (b), compares a result of the compensation with a predetermined threshold level, and produces a binary signal (e) representative of a result of the comparison. Hence, the processing which occurs in the processor 60 is the simple two-level or binary processing, the signal (e) carrying no halftone information. The processor 60 applies a six-bit digital image signal (C1) and a one-bit binary image signal (C2) to the image decision section 70. The image signal (C1) is an MTF-compensated signal and little differs from the image signal (b), while the image signal (C2) is the same as the image signal (e) except for the timing.

As will be described, the image decision section 70 functions to determine whether images in a document contain halftone information, that is, whether halftone images and two-level images are printed together in a document. The section 70 applies a binary signal (f) representative of a result of the decision to the output control 90. Specifically, the image decision section 70 binarizes the input image signal using a threshold level which differs from the one adapted for simple binary processing, and then shifts the resulting binary data by a predetermined number of pixels in at least either of the main scanning and the subscanning directions, that is, delays the signal timing to provide AND of the shifted data and the previously mentioned binary data. If the AND is a ONE, the section 70 determines that the pixel to be processed lies in a halftone image region and, if it is a ZERO, in a two-level image region.

The operation control 80 applies to the output control 90 a mode signal (g) representative of information which is keyed in through any of the mode keys K1–K4. Specifically, the mode signal (g) comprises mode signals $g_1$, $g_2$, $g_3$ and $g_4$. Also, the section 80 controls energization of the display lamps L1–L4 responsive to the mode signal.

The output control 90, responsive to the mode signal (g) from the operation control 80 and the binary signal (f) from the decision section 70, selectively outputs the binary image signal (d) outputted by the halftone processor 50, the binary image signal (e) outputted by the binary processor 60, and a signal having a predetermined level (white level). The output signal (h) of the output control 90 is applied as a recording signal to the printer 2. The printer modulates a laser beam responsive to the input binary signal, thereby printing out the image information.

Figure 4:
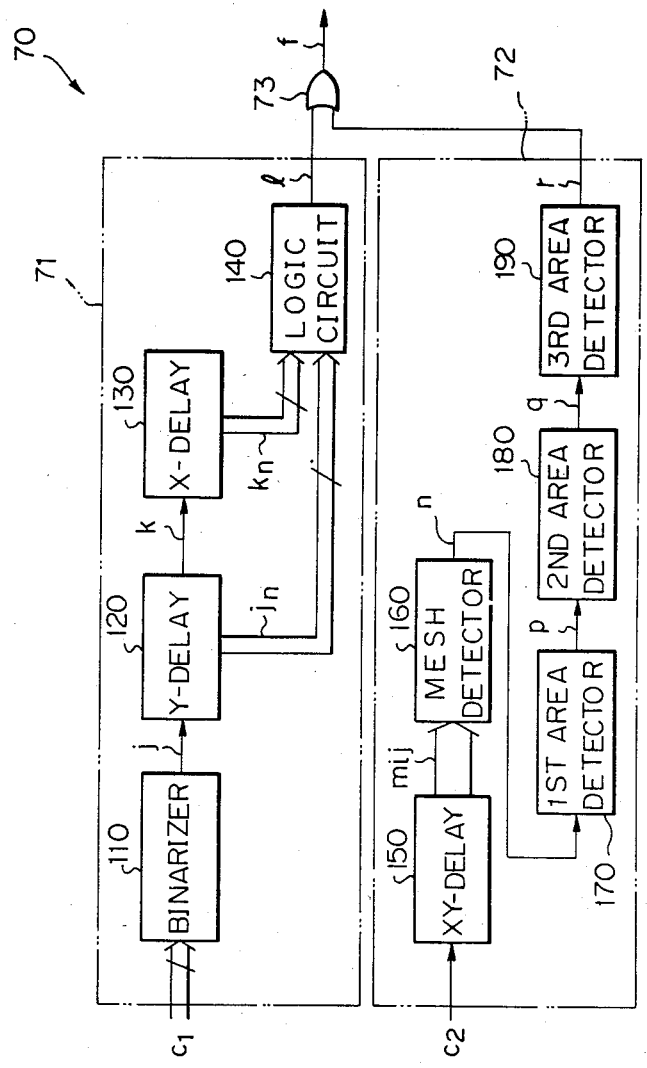
FIG. 4 is a block diagram of an image region decision section included in the arrangement of FIG. 3.

Referring to FIG. 4, a specific construction of the image decision section 70 of FIG. 3 is shown and made up of a first subsection 71, a second subsection 72, and an OR gate 73. Applied to the first subsection 71 is the six-bit image signal (C1) and to the second subsection 72, the one-bit image signal (C2). Appearing at the output terminal of the image decision section 70 is an OR (f) of an output signal (l) of the first subsection 71 and an output signal (r) of the second subsection 72.

Figure 5:
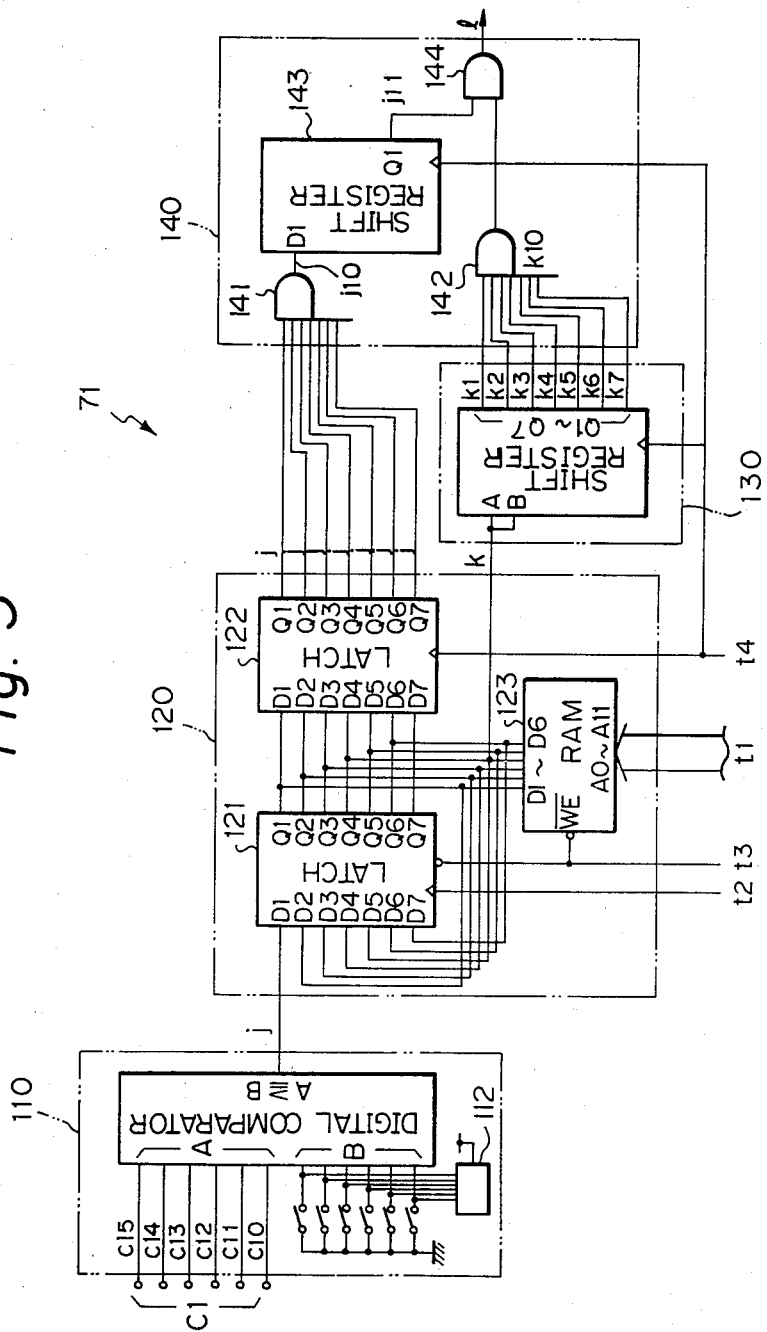
FIG. 5 is a circuit diagram showing a first decision subsection included in the decision section of FIG. 4.
Figure 6A:
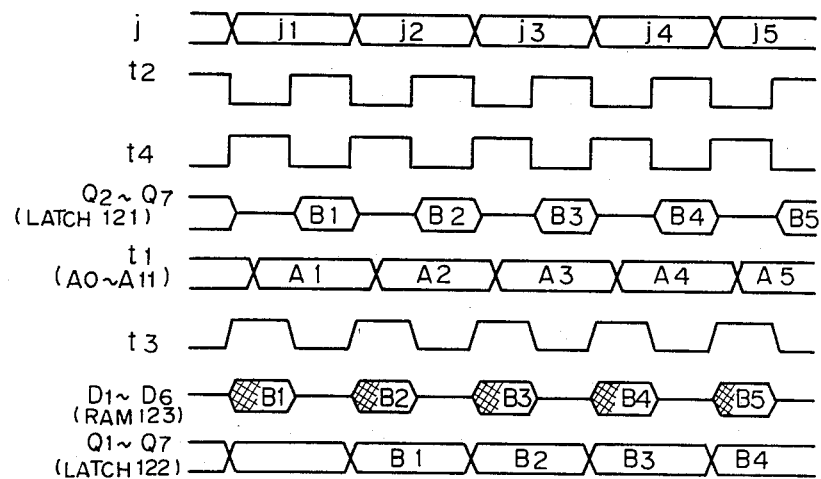

The first decision subsection 71 comprises a binarizer 110, a Y-delay circuit 120, an X-delay circuit 130, and an AND circuit 140. It is to be noted that the symbols "x" and "X" are used herein to represent the main scanning direction of the scanner 1 and symbols "y" and "Y" to indicate the subscanning direction. It is also to be noted that a ONE of the binary image signal represents a black pixel level and a ZERO a white pixel level. Details of the first subsection 71 is shown in FIG. 5. Waveforms of signals appearing in various portions of the first subsection 71 are shown in FIG. 6a, and exemplary timings of operation in FIG. 6b.

Referring to FIG. 5, the binarizer 110 of the first decision subsection 71 is made up of a digital comparator 111, a pullup circuit 112, and a switch circuit 113. The digital comparator 111 compares a digital signal appearing at its six-bit input terminal A with a digital signal appearing at the other six-bit input terminal B. The output (j) of the digital comparator 111 is a ONE (corresponding to a high level H) when A is equal to or greater than B and a ZERO (corresponding to a low level L) if not. Switches included in the switch circuit 113 are so set that the value at the input terminal B of the comparator 111 is controlled to a predetermined threshold value TH2. While the threshold value TH2 is variable, usually it represents a very low density level. In this particular embodiment, a threshold value TH1 which the binary processor 60 uses represents the medium density level (32). That is, this binarizer 110 determines even a pixel whose density is significantly lower than an ordinary black pixel decision level as having a black level.

The Y-delay circuit 120 shifts the output signal (j) of the binarizer 110 by a predetermined number of pixels in the y or subscanning direction to thereby delay the signal timing. The circuit 120 produces seven signals jn and k. In FIG. 5, each signal jn represents a signal provided by delaying the signal j by n pixels in the y direction, while the signal k is the same as the signal $j_3$ concerning the delay. Delaying signals pixel by pixel in the y direction allows signals associated with a plurality of pixels, which neighbor each other in the y direction, to be produced as parallel signals. In short, the circuit 120 may be regarded as a serial-to-parallel converter. The operation of the circuit 120 will be described with reference also made to FIG. 6a. The input signal (j) is latched in the latch 121 responsive to clock pulses t2 which are generated timed to pixels in the x direction. Specifically, the signal (j) applied to an input terminal D1 of the latch 121 appears at an output terminal Q1 of the same and this state is held. Responsive to clock pulses t3, statuses of output terminals Q1–Q6 of the latch 121 are loaded in different bits of a random access memory (RAM) 123 at the x direction pixel timing.

A memory address for storage is specified by an address signal t1. The content of the address signal t1 is updated for each pixel in the x direction; the same content (value) is set for those pixels which assume the same position with respect to the x direction. That is, the signal t1 is associated with pixel positions in the x direction. In this particular embodiment, the number of pixels in the x direction is 4,096 and, therefore, the signal t1 comprises twelve-bit parallel signals. Data stored in the RAM 123 are read thereoutof pixel by pixel in the x direction timed to the clock pulses t3. Each data read out of the RAM 123 is the data which has been precedingly stored in the current x direction position. Paying attention to the interconnection of data lines D1–D6 of the RAM 123 and the latch 121, bits 1, 2, 3, 4, 5 and 6 of the data lines of the RAM 123 are interconnected to bits 2, 3, 4, 5, 6 and 7 shifted one bit each. Therefore, a signal (j) entered at a certain timing is latched in the bit 1 of the latch 121 and, before the next pixel data is loaded in the latch 121, it is stored in the bit 1 of the RAM 123. At a timing which is delayed one pixel in the y direction, the signal (j) is read out of the bit 1 of the RAM 123 to be applied to an input terminal D2 of the bit 2 of the latch 121. This signal is latched in the bit 2 of the latch 121 at such a timing that a pixel signal which appears delayed one pixel in the y direction at its x position is latched in the bit 1 of the latch 121.

The above procedure is repeated thereafter so that the signal is sequentially shifted to the bits 3, 4, 5, 6 and 7 of the latch 121 every time the timing advances one pixel in the y direction. That is, when that signal has been latched in the bit 7 of the latch 121, signals which respectively are delayed one pixel, two pixels, three pixels, four pixels, five pixels and six pixels relative to the signal in the bit 7 are present in the bits 6, 5, 4, 3, 2 and 1. As a result, signals associated with seven pixels which neighbor each other in the y direction at the predetermined x position appear respectively at the output terminals Q1–Q7 of the latch 121 and at the same timing. The latch 122 serves to properly time the delivery of signals to the other circuits which are interconnected to the output terminals of the Y-delay circuit 120. Hence, the signals j0–j6 are substantially identical with those which are outputted by the latch 121. In FIG. 6a, it is to be noted that the symbols j1, j2, ..., B1, B2, B3, ... and A1, A2, A3, ... represent pixel-by-pixel changes of the respective signals in the x direction and differ from the output signals of the latch 122.

The signal k outputted by the Y-delay circuit 120 is routed to the X-delay circuit 130. As shown in FIG. 5, the X-delay circuit 130 comprises a single shift register. The signal (k) is applied to a serial data input terminal of the shift register. The shift register produces at its parallel data output terminals Q1–Q7 signals (k1, k2, k3, k4, k5, k6 and k7). The shift register (130) shifts data one bit at a time very time a clock pulse t4 appears, which in turn appears every time the scanning position in the x direction is changed on a pixel basis. For example, a signal k applied to the shift register at a certain timing appears at the bit 1 of the output terminals (k1) at the next pixel timing (x direction) and is sequentially transferred to the bits 2, 3, 4, 5, 6 and 7 every time the pixel timing is changed. For example, when a signal associated with a pixel which is positioned at N in the x direction pixel coordinates appears as a signal (k7), the positions of pixels which appear in the other signals (k6, k5, k4, k3, k2 and k1) are the same as the signal (k7) in the y direction and respectively N+1, N+2, N+3, N+4, N+5 and N+6 in the x direction. That is, the signals (k1 to k7) are associated with seven pixels which neighbor each other in the x direction and such signals are produced at the same timing. In this respect, the X-delay circuit may be regarded as a serial-to-parallel converter for manipulating serial pixel signals.

The output signals (j0 to j6 and k1 to k7) of the Y-delay circuit 120 are also applied to the AND circuit 140. An AND gate 141 produces a ONE when all the signals (j0 to j6) are ONEs and a ZERO when otherwise. Therefore, the output (j10) of the AND gate 141 becomes a ONE when all the seven pixels which share the same position with respect to the x direction and neighbor each other in the y direction are black levels (with respect to TH2). The signal j10 is delayed by a shift register 143 by a predetermined number of pixels (i pixels) in the x direction and, then, applied to an AND gate 144 as a signal (j11). An AND gate 142 produces a ONE when all the signals (k1 to k7) are ONEs and a ZERO when otherwise. Hence, the output signal (k10) of the AND gate 142 becomes a ONE when all the seven pixels which share the same position with respect to the y direction and neighbor each other in the x direction are black levels (with respect to TH2). The AND gate 144 produces AND of the signals (j11) and (k10), or signal (l).

It will be seen from the above that the first decision subsection 71 decides that a particular pixel currently observed carries halftone information (1 is a ONE) when seven pixels in the x direction and seven pixels in the y direction with the observed pixel positioned at the center are black levels (with respect to TH2). The signal (j11) is shifted in the x direction relative to the signal (j10) by means of the shift register 143 as described. This is effective to adjust the timings of the seven pixels in the x direction and the seven pixels in the y direction. Specifically, since the signals (j0–j6) are the same in position as the signal (k) with respect to the x direction, the signal (j10) is shifted i pixels (four pixels in this particular embodiment) in the x direction so that a signal (j11) at the x position which is associated with the signal (k4) which in turn is associated with the center pixel in the x direction may be obtained. That is, since a majority of small patterns are generally close to circles, it is preferable to locate an observed pattern at the center pixel of a group of pixels which constitute a "+" pattern.

Referring to FIG. 6b, the digital signal (C1) is represented in an analog fashion with respect to tone levels 1–64, which are indicated along the ordinate. While in practice images are decided referencing image information in both the x and y directions, the decision in FIG. 6b is shown in relation to image information only in the x direction in order to facilitate an understanding. Since the digital image signal (C1) has six bits, it carries information associated with sixty-four consecutive density levels. In this example, the signal (C1) includes portions (C11 and C12) which are derived from halftone images such as photographs, a portion (C13) derived from a background (white) image, a signal (C14) derived from a relatively bold line of a character (i.e. two-level density image), a portion (C15) derived from a relatively thin line of a character, and portions (C16 and C17) derived from contaminations in a document.

The binarizer 110 processes a signal selecting a low density level TH2 as a threshold level as previously stated. Hence, in the image signal (j), all the portions where images are present correspond to black pixels even through the image density may be very low. Meanwhile, in the signal (e) outputted by the binary processor 60 whose threshold level is the medium level 32, concerning halftone images, only those portions where the density is low correspond to white pixels and only those portions where the density is high correspond to black pixels. The signal (k10) becomes a ONE only when black appears in seven consecutive pixels in the x direction, that is, only when the pattern is greater than a predetermined size. Hence, the signal (k10) becomes a ONE for the signal portions (C11, C12 and C14) and a ZERO for the other signal portions (C13, C15, C16 and C17). Since either the halftone-processed signal (d) or the binary signal (e) is usually selected depending upon the signal (k10), those portions of the signal (h) shown in FIG. 6b which are designated by symbols A, B and C correspond to the halftone-processed signal (d), while the other portions D, E and F correspond to the binary signal (e). Although the portions C, D and E belong to a single character, the portions D and E corresponding to a contour portion (each having six pixels in the x direction) are binary because they are short of sevel pixels, the requisite decision condition for halftone information. The portions (C16 and C17) of the signal (C1) are binary and processed with respect to the threshold level TH1, so that contaminations in a document do not appear in a reproduction.

Figure 7:
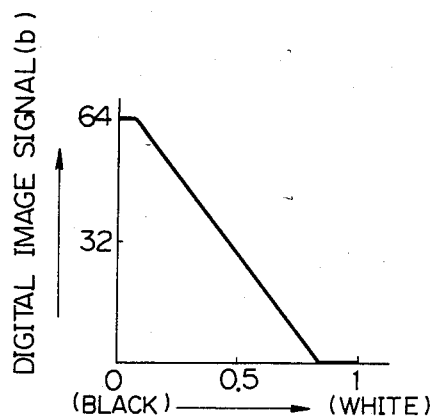
FIG. 7 is a plot showing an image density to reflectivity characteristic which is observed by scanning a document surface using a scanner.

Referring to FIG. 7, there is shown a relationship between reflectivity attainable by optically scanning a document by means of the sensor 10 and a digital image signal (b) which has been white-black converted by the AD converter 40 and quantized with respect to sixty-four levels. In FIG. 7, saturation of white in the vicinity of reflectivity of 1 (one) is the result of removal of the background density of a document which is effected by background removal, while saturation of black in the vicinity of reflectivity of 0 (zero) is employed with the intention of confining densities higher than a predetermined one in the level 64 so that a greater number of tones may be allocated to halftone levels.

Meanwhile, where the delayed data (j) and (k) produced by shifting the data, which have been provided by binarizing the digital image signal (C1) using the threshold TH1, by a predetermined number of pixels (eight in this embodiment) in each of X and Y directions are applied to the AND circuit 140 to select the binary data (d) or (e), each of the hatched, halftone-processed portions of the recording signal (h) which respectively are associated with the halftone-processed portions (C11) and (C12), for example, is undesirably subjected to simple binary processing in narrow regions adjacent to opposite ends thereof, despite that they belong to halftone image portions in a document. In this particular edge regions, as indicated by double-hatching in FIG. 6b, if the associated digital image signal (C1) has a level higher than the threshold TH2, a ONE will be outputted by simple binary processing; and if it has a level lower than the threshold TH2, a ZERO will be produced by simple binary processing. This is not critical insofar as the original density of the halftone images in the edge portions of document images are noticeably low. However, in a situation wherein the density lies between the thresholds TH1 and TH2, for example, ZEROs appearing at the edge portions adversely affect halftone images which will be reproduced.

Figure 8:
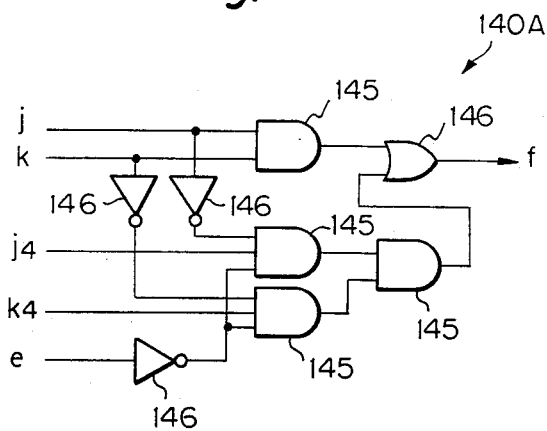
FIG. 8 is a circuit diagram showing a modification to an AND circuit of FIG. 5.

Referring to FIG. 8, a modification to the AND circuit 140 which eliminates the above drawback is shown. The modified AND circuit 140A comprises AND gates 145 and inverters 146. The AND circuit 140A delivers to the output control 90 decision signals (f) which represent a result of decision of an image region. Specifically, the decision signals (f) consist of a signal representative of AND of the binary data (j) outputted by the Y-delay circuit 120 and the binary data (k) outputted by the X-delay circuit 130, and a logical decision signal associated with a state of the simple binarized data (e) in which the edge conditions are that both of (j4) and (k4) be a ONE and that both the binary data (j) and (k) be a ZERO.

Therefore, where simple binary data associated with an edge portion of a halftone image region which has been decided as above mentioned is a ZERO, the AND circuit 140A processes the edge portion as a halftone image region; where it is a ONE, the AND circuit 140A processes it as a two-level image region.

Specifically, the AND circuit 140A is constructed such that assuming an edge condition wherein both the binary data (j) and (k) are a ZERO and both the binary data (j4) and (k4) which are advanced each by four pixels relative to the data (j) and (k) are a ONE, the simple binarized data (e) which appears under the above condition is applied to the output control 90 as the decision signal (f). At this instant, if the density level in the edge portion is lower than the threshold TH2, there hold e=ONE and f=ONE so that the output control 90 selects the halftone-processed data (d). On the other hand, if the density level in the edge portion is higher than the threshold TH2, there hold e=ONE and f=ONE so that the output control 90 selects simple binary data (e) of that instant. In FIG. 6b, the double-hatched regions in the recording signal (h) represent edge outputs derived from halftone processing.

The above procedure allows edge portions to be processed in conformity to actual densities of document images and, thereby, enhances quality reproduction of halftone images.

In accordance with the illustrative embodiment, even if halftone image regions in a document are those which were halftone processed previously, it is possible to effectively decide that they are halftone image regions. Specifically, halftone processing is adapted to render halftones in terms of a density of binarized dots and a pattern of an aggregation of dots and such a representation does not cause any halftone to be lost. Hence, where an arrangement is made such that continuous appearance of a density higher than a predetermined one is decided to represent a halftone image region as in the illustrative embodiment, it is possible to determine a portion of a document where the dot density is high, for example, as a halftone image region. Such enables images to be favorably reproduced even in those half tone image areas of a document which were halftone processed.

While in the illustrative embodiment an image region is discriminated based on delayed data which are produced by binarizing he digital image signals (C1) with respect to both the X and Y directions, the discrimination may be implemented with only one of the X direction and Y direction delayed data.

Concerning the circuit arrangement, too, the illustrated arrangement may be suitably modified within the scope of the present invention. For example, the digital image signals (C1) to be processed are not limited to image information which is read out of a document by a scanner but may even be digital video data which are outputted by a host computer in a certain system.

The threshold levels TH1 and TH2 which respectively assigned to the binarizer 110 of the image decision section 70 and the binary processor 60 may each be provided with a hysteresis characteristic. For example, the hysteresis characteristic may be such that the threshold level TH1 is variable over a narrow width depending upon ONE/ZERO of the two-level j which is processed with the threshold TH1. Then, once a certain image region is decided to be a halftone region, for example, a portion with a lower density which may appear in that image region will be prevented from being decided to be a two-level region.

Further, in the illustrative embodiment, the delay of the digital image signal (C1) in each of the X and Y directions may have any desired value or, alternatively, provided with a plurality of values which are selectively set up depending upon the conditions of document images.

Referring again to FIG. 4, the second decision subsection 72 which, in short, serves as a circuit for deciding whether a mesh pattern is present is shown. The signal (C2) which the subsection 72 processes is produced by simple binarizing the signal (C1) with respect to the fixed threshold level TH1 and, disregarding timings and others, it may be considered identical with the signal (e) outputted by the binary processor 60. As shown, the second decision subsection 72 comprises an XY-delay circuit 150, a mesh detector 160, a first area detector 170, a second area detector 180, and a third area detector 190. The XY-delay circuit 150 processes the signal (C2) to produce a signal (mij), the mesh detector 160 processes the signal (mij) to produce a signal (n), the first area detector 170 processes the signal (n) to produce a signal (p), the second area detector 180 processes the signal (p) to produce a signal (q), and the third area detector 190 processes the signal (q) to produce a signal (r).

Figure 9A:
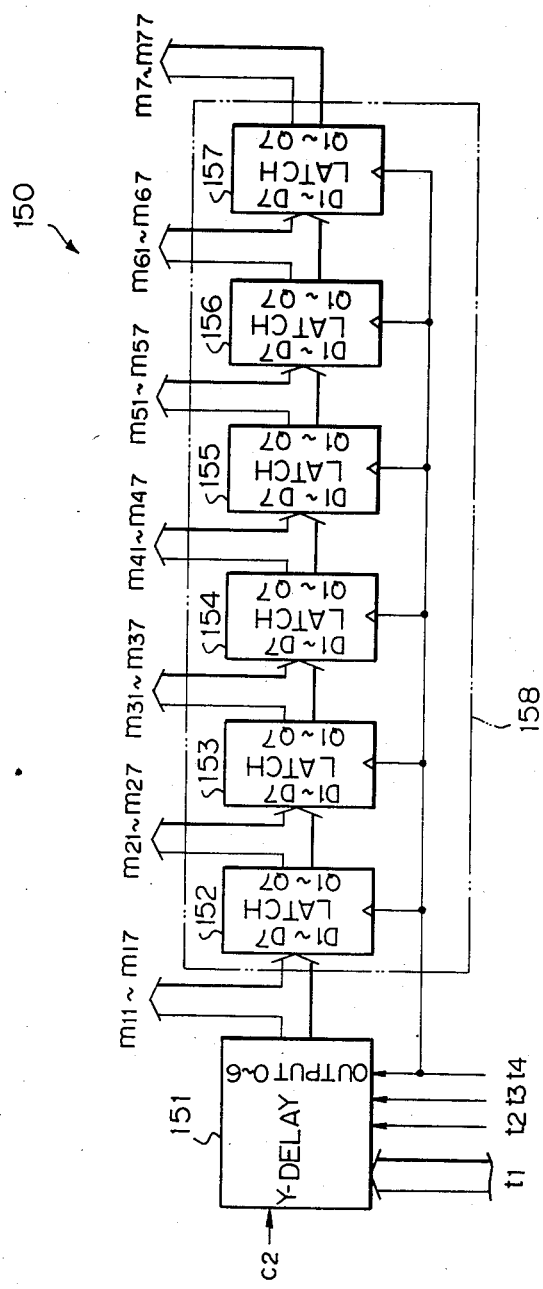
FIGS. 9a–9d are circuit diagrams representative of a second decision subsection included in the decision section of FIG. 4.

Referring to FIG. 9a, a specific construction of the XY-delay circuit 150 is shown. The delay circuit 150 comprises a Y-delay circuit 151 and an X-delay circuit 158. The Y-delay circuit 151 shares the same construction as the Y-delay circuit 120 shown in FIG. 5 except that, since the circuit 151 does not need a signal corresponding to the signal (k), it uses only the seven outputs of the latch 122. That is, signals (m11–m17) which are produced from the Y-delay circuit 120 are associated with seven pixels which are the same in the x direction and adjacent to each other in the y direction. The X-delay circuit 158 is made up of six seven-bit latches 152, 153, 154, 155, 156 and 157. The latch 152 latches the output signals (m11–m17) of the Y-delay circuit 151. The latches 153, 154, 155, 156 and 157 latch respectively output signals (m21–m27), (m31–m37), (m41–m47), (m51–m57) and (m61–m67) of the latches 152, 153, 154, 155 and 156 responsive to clock pulses t4. In this construction, the signals (m21, m31, m41, m51, m61 and m71) are the signals which respectively are delayed by one pixel, two pixels, three pixels, four pixels, five pixels and six pixels in the x direction relative to the signal (m11). That is, the XY-delay circuit 150 produces all the signals mij associated with the respective pixels of 7×7 pixel matrix at the same timing, the pixel matrix comprising seven pixels in the x direction and seven pixels in the y direction.

Figure 9B:
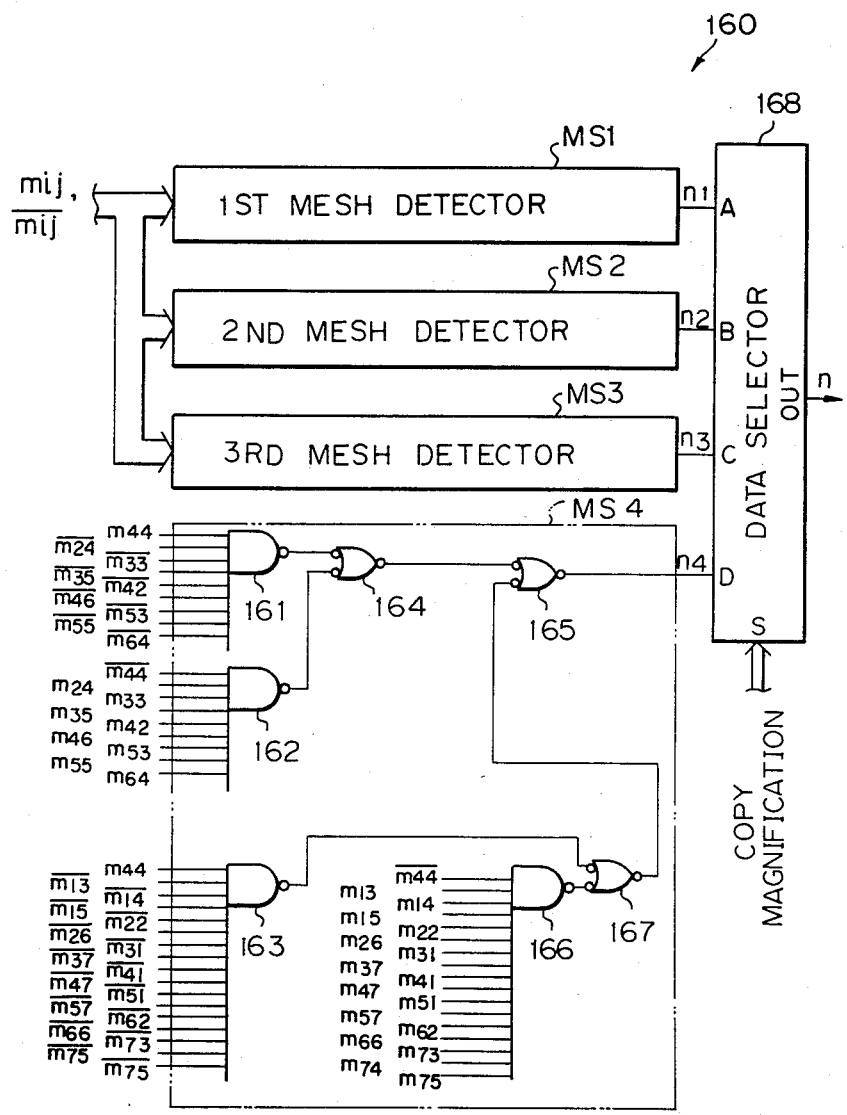

Referring to FIG. 9b, a specific construction of the mesh detector 160 is shown. The mesh detector 160 is made up of a first mesh detector MS1, a second mesh detector MS2, a third mesh detector MS3, a fourth mesh detector MS4, and a data selector 168. The signals mij outputted by the XY-delay circuit 150 are applied to each of the first to fourth mesh detectors MS1–MS4.

As shown, the fourth mesh detector MS4 comprises gates 161, 162, 163, 164, 165, 166 and 167. In the drawing, symbols mij with overlines should be understood to designate signals which are logically inverted versions of those signals which are designated by non-overlined symbols; although not shown in the drawing, a number of inverters intervene between the output terminals of XY-delay circuit 150 and the input terminals of the mesh detector 160. For convenience, the overlines will be replaced with underlines in the following description. Applied to nine input terminals of the gate 161 are the signals m44, m24, m33, m35, m42, m46, m53, m55 and m64; coupled to nine input terminals of the gate 162 are the signals m44, m24, m33, m35, m42, m46, m53, m55 and m64; coupled to seventeen input terminals of the gate 163 are the signals m44, m13, m15, m22, m26, m31, m37, m41, m51, m57, m62, m66, m73, m74 and m75; and coupled to seventeen input terminals of the gate 166 are the signals m44, m13, m14, m15, m22, m26, m31, m37, m41, m51, m57, m62, m66 m73, m74, and m75.

Figure 10A:
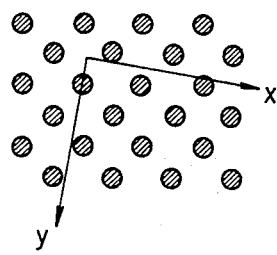
FIGS. 10a–10c are enlarged plan views showing images which are mesh-printed with three different densities.
Figure 10B:
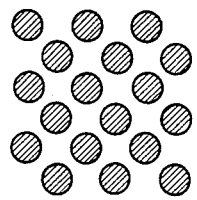
Figure 10C:
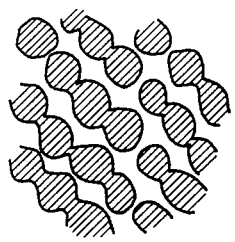

Before entering into detailed description of the operation of the mesh detector 160, mesh-printing will be discussed with reference to FIGS. 10a–10c. In FIGS. 10a–10c, there are shown parts of images having three different densities (10%, 30% and 50% in terms of reflectivity) and provided by mesh-printing with the same mesh pitches, each of the images being enlarged to a degree which allows dots to be readily discriminated. Hatched portions represent printed (black) portions and the others, the background (white). Although not shown, when the density is 70% and 90%, a condition occurs wherein black/white appears opposite to the cases with densities of 10% and 30%, respectively. As shown in FIG. 10a, in which the density is 50%, it is recognizable that some nearby dots are closer to each other than the other nearby dots. In practice, the inclination of the direction of dot arrangement in the scanning directions x and y of a scanner to each other is not constant due to, for example, inclination of the scanner and a document read by the scanner to each other. Also, the diameter of the recording dots is not constant. Presence/absence of such a mesh has to be decided by the second decision subsection 72. In any case, it will be understood that in a document image provided by mesh-printing black dots are distributed in a white background or white dots in a black background. The mesh detector 160 sees if each particular pixel observed corresponds to such a dot.

Figure 11:
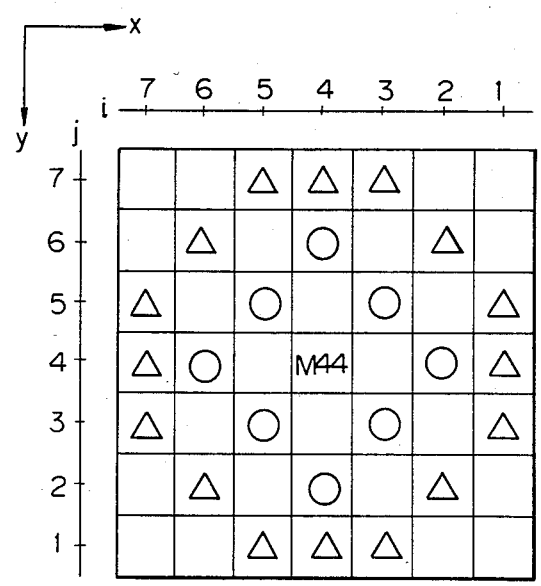
FIG. 11 is a plan view of a pixel arrangement which is used by a mesh detector for deciding presence/absence of a dot.

The fourth mesh detector MS4 determines whether an observed pixel M44 (associated with the signal m44) which is located at the center of a 7×7 pixel matrix as shown in FIG. 11 is a black dot (presence of a black pixel in a group of white pixels) or a white dot (presence of a white pixel in a group of black pixels), referencing the relationship between the observed pixel M44 and surrounding pixels which are marked with circles and triangles in the drawing. Specifically, the gate 161 produces a ZERO, or signal representative of presence of a black dot, if the observed pixel M44 is a ONE (black pixel) and all the circled pixels are ZEROs (white pixels); the gate 162 produces a ZERO, or signal representative of presence of a white dot, if the observed pixel M44 is a ZERO and all the circled pixels are ONEs; the gate 163 produces a ZERO, or signal representative of presence of a black dot, if the observed pixel M44 is a ONE and all the pixels with triangles are ZEROs; the gate 166 produces a ZERO, or signal representative of presence of a white dot, if the observed pixel 44 is a ZERO and all the pixels with triangles are ONEs. When any one of the gates 161, 162, 163 and 164 has produced a signal indicative of presence of a black dot or a white dot, the fourth mesh detector MS4 produces a ZERO, or signal representative of absence of a dot, as a signal n4. Here, the purpose of referencing the two different kinds of arrangement patterns, i.e., the pixel group located at the positions with circles and that located at the positions with triangles, is to cope with any variation in the mesh pitch and dot diameter and, thereby, enhance accurate detection.

The first to third mesh detectors MS1–MS3 each share the same construction as the fourth mesh detector MS4 except for the signals mij which are applied to the input terminals. Specifically, the mesh detectors MS1–MS4 are distinguishable from each other with regard to the positions of pixels which are used for the decision of presence/absence of a dot. Such different conditions are predetermined for different magnifications, taking into consideration changes in dot diameter due to changes in magnification.

Referring to FIG. 9b, a magnification signal line is connected to a select terminal S of a data selector 168. Therefore as the magnification is changed, the data selector 168 selects one of the output signals n1, n2, n3 and n4 of the mesh detectors M1–M4 responsive to a new magnification. This implies that in the illustrative embodiment a dot detection condition is automatically changed using the magnification as a parameter.

Figures 12A, 12B:
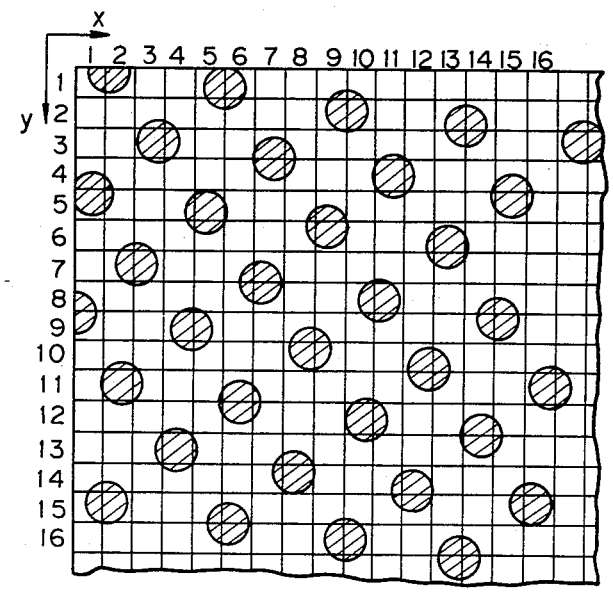

Referring to FIG. 12a, an example of positional relationships between dots in a mesh image and pixels is shown. When binarized with respect to the threshold TH1, the pixels shown in FIG. 12a will have ONEs and ZEROs as shown in FIG. 12b. In these drawings, the pixel pitch is assumed to be 1/16 (millimeter per pixel), and the mesh pitch 1/5 millimeter per pixel). The x and y axes of FIG. 12a correspond respectively to those of FIG. 12b. In this particular example, concerning the pixel at the coordinates (15, 4), for example, the observed pixel is a ONE and all the nine pixels which are circled as shown in FIG. 11 are ZEROs and, hence, that particular pixel is decided as containing a dot. While a signal n indicative of presence/absence of a dot basically appears at the output of the mesh detector 160, farther processing which will be described is performed because the positional relationship between pixels and dots changes in various manners.

Figure 9C:
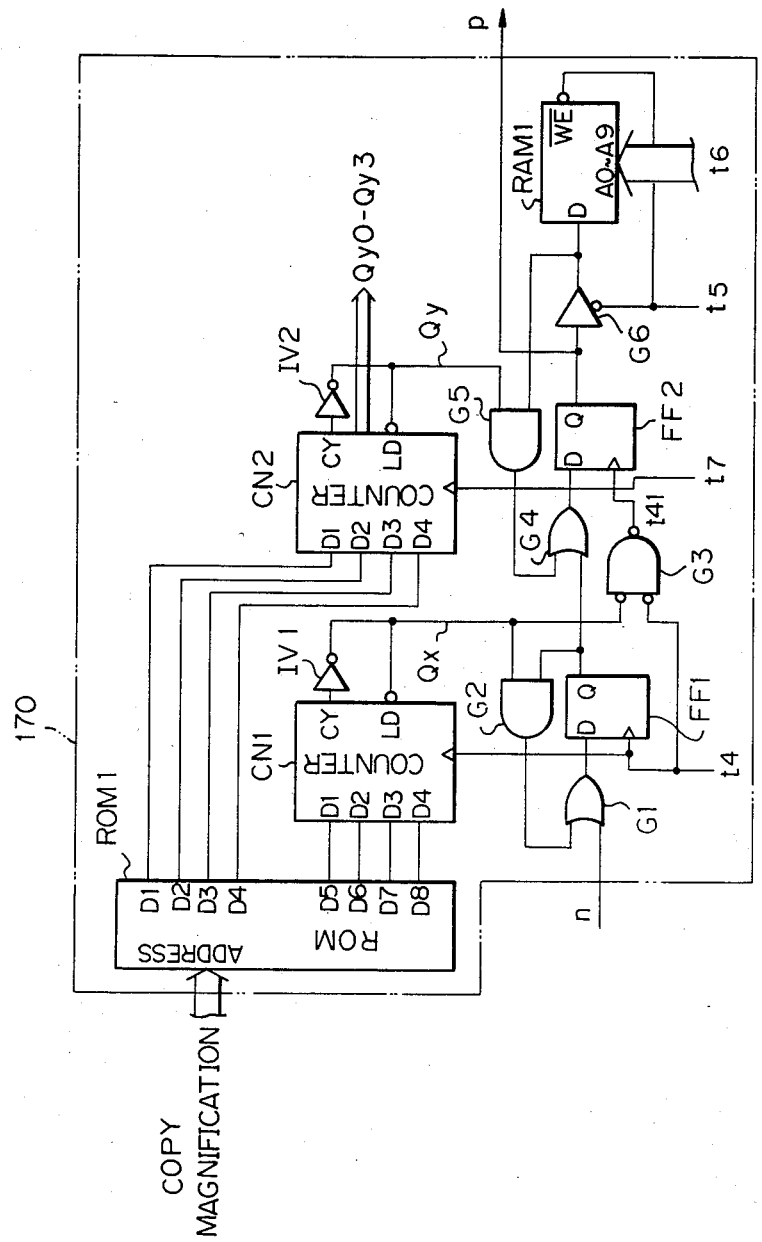

Referring to FIG. 9c, a specific construction of the first area detector 170 is shown. Briefly described, the first area detector 170 assumes predetermined pixel matrices (hereinafter referred to as first areas) each having w pixels in the x direction and w pixels in the y direction, as shown in FIG. 13. The detector 170 determines whether one or more dots are present in each of the first areas. The signal p is a ONE when one or more dots are present and a ZERO when otherwise. As shown in FIG. 9c, the detector 170 comprises a read only memory ROM1, counters CN1 and CN2, flip-flops FF1 and FF2, a random access memory RAM1, gates G1, G2, G3, G4, G5 and G6, and inverters IV1 and IV2.

Figure 14A:
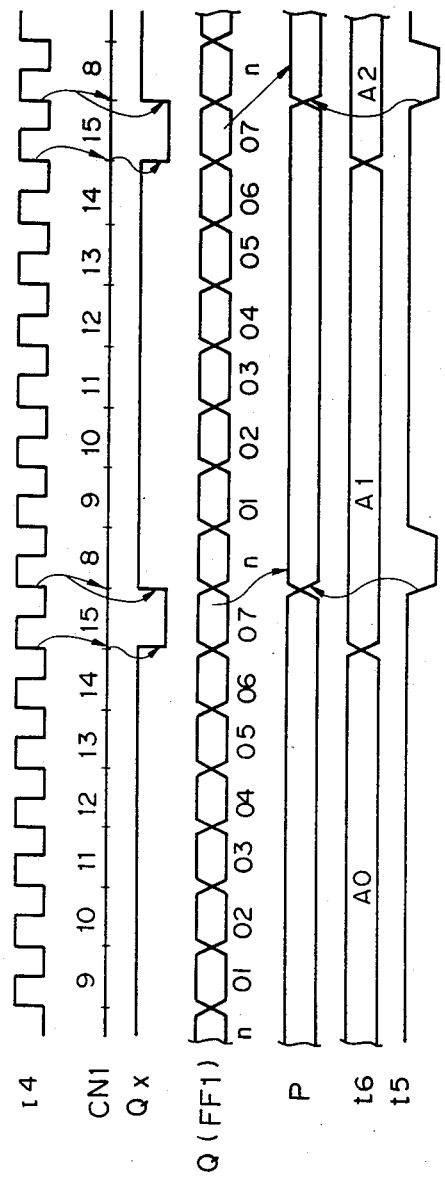
FIGS. 14a and 14b are timing charts demonstrating respectively the operations of a first area detector and a second area detector.

Referring to FIG. 14a, the operation timing of the first area detector 170 shown in FIG. 9c is shown. The counter CN1 counts clock pulses t4 and counts up responsive to each pixel in the x direction. As the count reaches "15", a carry terminal CY of the counter CN1 becomes high level H. A signal which is an inverted version of the high level signal is applied to a preset terminal LD of the counter CN1 so that upon appearance of the next clock pulse the data at input terminals D1–D4 are set in the counter CN1. In FIG. 14a, data to be preset is "8". The counter CN, therefore, serves as an N-bit counter which counts up responsive to each clock pulse t4. The value of N is open to choice within the range of "1" to "16". Appearing in the signal line Qx is a signal which becomes low level L responsive to each N clock pulses t4 and remains low level L over a duration which is equal to one period of the clock pulses t4.

Meanwhile, the signal n associated with each pixel in the x direction is routed through the OR gate G1 to the flip-flop FF1 and, timed to a clock pulse t4, latched in the flip-flop FF1. If the signal line Qx is high level H, the signal latched in the flip-flop FF1 is applied from the output terminal Q to one input terminal of the OR gate G1 via the AND gate G2. In this construction, once the signal n becomes a ONE, the output terminal Q of the flip-flop FF1 maintains the ONE (H) state until the signal line Qx becomes low level L. Specifically, where the counter CN1 is conditioned to serve as an octonary counter, a signal n associated with a certain first pixel appears at the output terminal Q of the flip-flop FF1 as a signal "01" and, then, an OR of the signal "01" and the next signal n appears at the terminal Q as a signal "02". Such a procedure is repeated until the signal line Qx goes low. Then, a result of operation of ORs of all the signals n which are associated with eight consecutive pixels in the x direction appears at the output terminal Q of the flip-flop FF1 as a signal "07". When the next clock pulse t4 has arrived while the signal "07" is present, the latter is latched in the flip-flop FF2 and this latched signal is delivered as the signal p. At the same time, the output signal of the flip-flop FF2 is written into the RAM1 timed to a clock pulse t5. A signal t6 adapted to specify addresses of the RAM1 is updated responsive to each N pixels in the x direction to a value which corresponds to each particular position in the x direction. Here, the signal t6 has no relation with the pixel position in the y direction. Hence, one line of data in the x direction are stored in the RAM1. Timed to clock pulses t41, data stored in the RAM1 in the preceding line (a position where the relative coordinates in the y direction is "−1") are read out and applied via the AND gate G5 to one input terminal of the OR gate G4.

The counter CN2 functions as an N-bit counter which counts up evey time a clock pulse t7 appears. The clock pulse t7 is a subscan synchronizing pulse which is produced every time the pixel position in the y direction changes. The rest of the operation of the counter CN2 is the same as the counter CN1. A signal line Qy, therefore, usually remainss high level H and becomes low level L once for each N pixels in the y direction. When the high level H is applied even once to a data terminal D of the flip-flop FF2 while the signal line Qy is high level, the RAM1 holds an OR of the high level and the input signal with the result that the signal p becomes high level H. Specifically, a result of operation of all the ORs of the signals which the flip-flop FF1 outputted (e.g. "07") appears as the signal p. More specifically, if at least one of the signals n associated with the pixels in each N×N (e.g. 8×8) pixel matrix, or first area, is a ONE, the signal p turns to a ONE; if not, it is a ZERO. This signal p is representative of presence/absence of a dot or dots, or that of a mesh, in the first area detector.

Figure 9D:
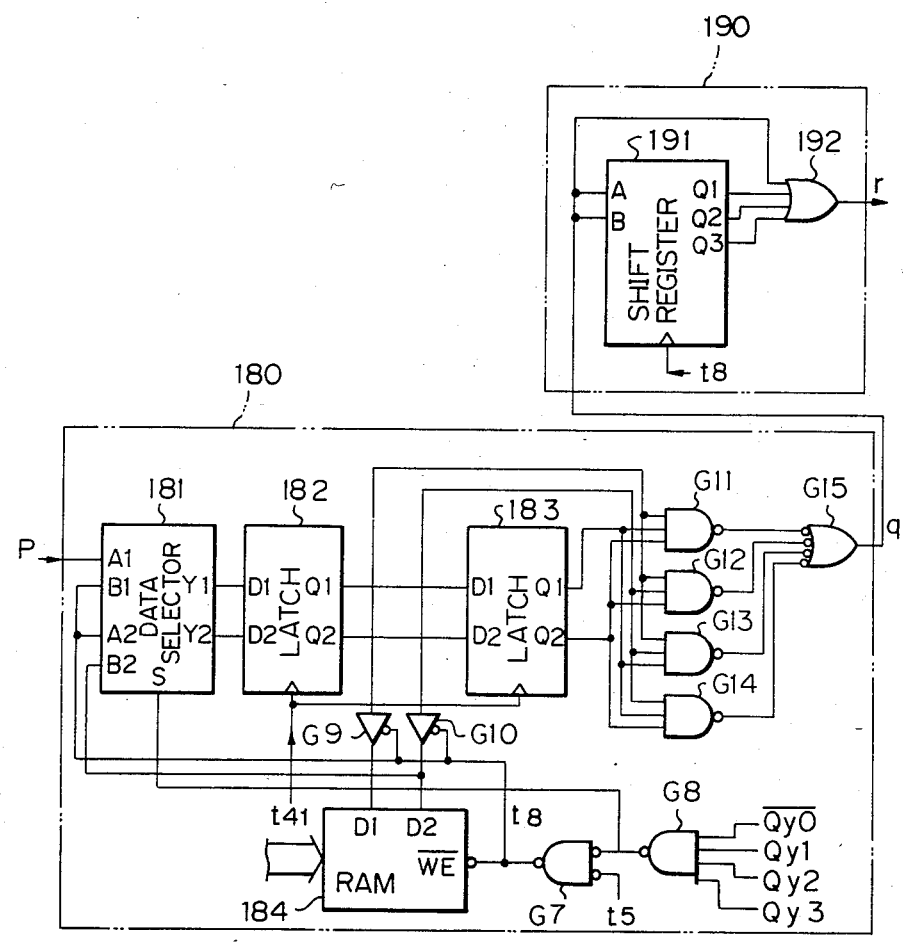

Meanwhile, data terminals D1–D4 of the counter CN1 respectively are interconnected to data terminals D5–D8 of the ROM1, while those D1–D4 of the counter CN2 respectively are interconnected to data terminals D1–D4 of the ROM1. A copy magnification signal is coupled to an address terminal of the ROM1. The ROM1 stores data representative of various sizes of the first areas which respectively are matched with different magnifications. For example, since each first area in this embodiment is assumed to have 8×8 pixels for a magnification of 1.0, "8" is applied to four-bit output terminals D1–D4 of the first group of the ROM1 and to four-bit output terminals D5–D8 of the second group. In this instance, the counters CN1 and CN are each loaded with "8" at the presetting stage and counts as "8, 9, 10, 11, 12, 13, 14, 15, 8, 9, 10, ... ", thus operating as octonary counters. For a different magnification, the counting range of the counters CN1 and CN2 and, therefore, the size of the first areas (number of pixels) is changed. Referring to FIG. 9d, specific constructions of the second area detector 180 and third area detector 190 are shown.

The second area detector 180 assumes, as shown in FIG. 13, a second are, which is made up of four first areas, i.e. two first areas which neighbor each other in the x direction and two first areas which neighbor them in the y direction. The detector 180 determines whether three or more of the first areas in the second area contain dots therein (signal p being a ONE). If three or more first areas contain dots, the detector 180 turns a signal q associated with a predetermined one of the first areas in the second area to a ONE to indicate the detection of a mesh. Such detection of a second area is directed to eliminating erroneous detection. Specifically, omission of dots attributable to a document and caused by defective printing, for example, or erroneous dot detection attributable to the copier and caused by defective readout, for example, is apt to allow a portion which actually is a mesh to be decided as a non-mesh portion at the signal p stage. Also, where an image is not a mesh image, a portion of a character or contamination in the background, for example, is sometimes detected as one dot and erroneously decided as a mesh region at the signal p stage.

Figure 14B:
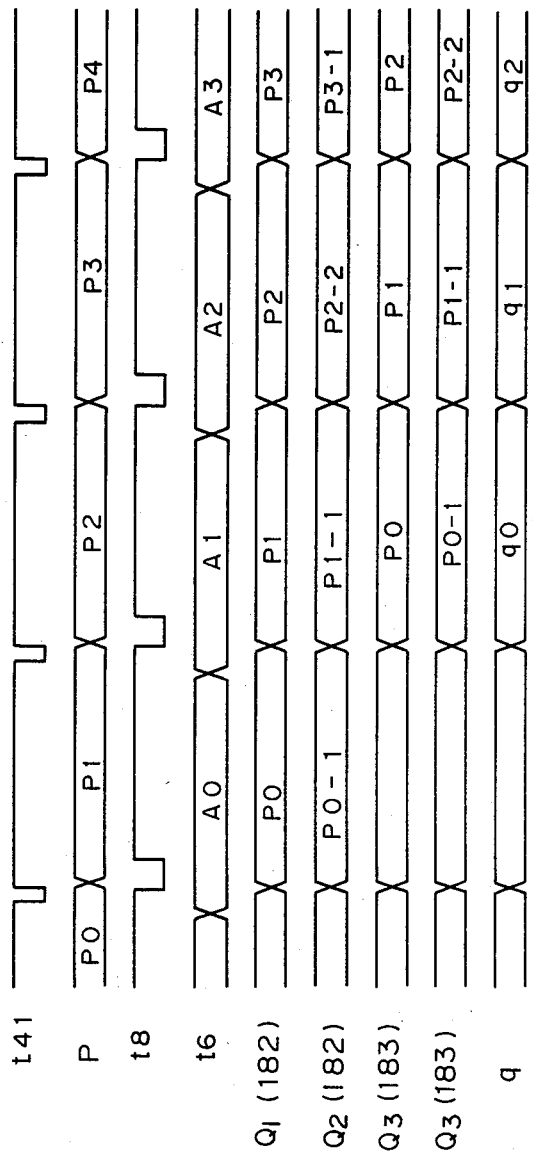

The operation timing of the second area detector 180 will be described with reference also made to FIG. 14b.

As shown in FIG. 9d, the detector 180 comprises a data selector 181, latches 182 and 183, and a RAM 184. The data selector 184, latch 182 and RAM 184 are adapted to delay signals p, which are each associated with a first area, in the y direction by an amount corresponding to the pixels which constitute a first area. In this construction, signals associated with two first areas which neighbor each other in the y direction appear at the same timing at output terminals Q1 and Q2 of the latch 182. The latch 183 functions to delay each of the output signals of the latch 182 in the x direction by an amount corresponding to the pixels of a first area. Therefore, appearing at output terminals Q1 and Q2 of the latch 183 are the signals which respectively are produced by delaying the signals appearing at the terminals Q1 and Q2 of the latch 182 by an amount of one first area in the x direction. In this manner, signals p associated respectively with the four first areas which are included in the second area appear at the same timing at the output terminals Q1 and Q2 of the latch 182 and those of the latch 183.

Specifically, signals p associated with the first areas E1, E2, E3 and E4 respectively appear at the output terminals 183-Q1, 182-Q1, 183-Q2 and 182-Q2. These four signals are manipulated by the gates G11, G12, G13, G14 and G15 to produce a signal q. If three or more of the four signals are ONEs, the signal q becomes a ONE. For example, in FIG. 13, if the signals p associated with three or more of the first areas E1, E2, E3 and E4 are ONEs, the signal q responsive to the first area E4 is a ONE. In FIG. 14b, symbols p0, p1, p3, p4, . . . represent the signals p outputted one for each first area; q0, q1, . . . represent the signals q outputted one for each first area; and p0-1, p1-1, p2-1, . . . represent the signals produced respectively by delaying the signals p0, p1, p2, . . . in the y direction each by an mount which corresponds to the number of pixels in one first area. For example, the signal q1 depends upon the four signals p1-1, p1, p2-1 and p2.

The third area detector 190 assumes a third area which is made up of four first areas which are contiguous in the x direction, as shown in FIG. 13. If at least one of the first areas in the third area contains a dot or dots, the detector 190 decides that this third area is a mesh region and turns a signal r to a ONE. Such third area detection processing is a measure taken against moire. Moire develops with a far greater probability in the main scanning direction than in the subscanning direction due to the particular scanning method and for structural reasons. in the subscanning direction, moire does not occur at all or is unnoticeable. Concerning the main scanning direction, moire is generally observed when the mesh pitch lies in the range of substantially 1-3 millimeters with a readout resolution of sixteen pixels per millimeter. Should the amplitude of a signal read out be reduced by moire, the accuracy of dot detection would be lowered to introduce errors in dot detection. Stated another way, the third area detection processing is needless if there is no fear of moire.

In this particular embodiment, since the number of pixels in the third area in the x direction is thirty-two and the resolution is sixteen pixels per millimeter, the pitch of the third area is 2 millimeters.

As shown in FIG. 9d, the third area detector 190 comprises a shift register 191 and an OR gate 192. The shift register 191 shifts the signal q for each number of pixels in the x direction in a first area timed to clock pulses t8. As the signal q becomes a ONE even once in the four first areas which are contiguous in the x direction, the signal r is turned to a ONE for all the first areas which constitute the third area inclusive of that particular first area. For example, in FIG. 13, as the signal q becomes a ONE in the first area E6 of the third area, the signal r becomes a ONE for all the other first areas E1, E2 and E5, too.

Figure 15:
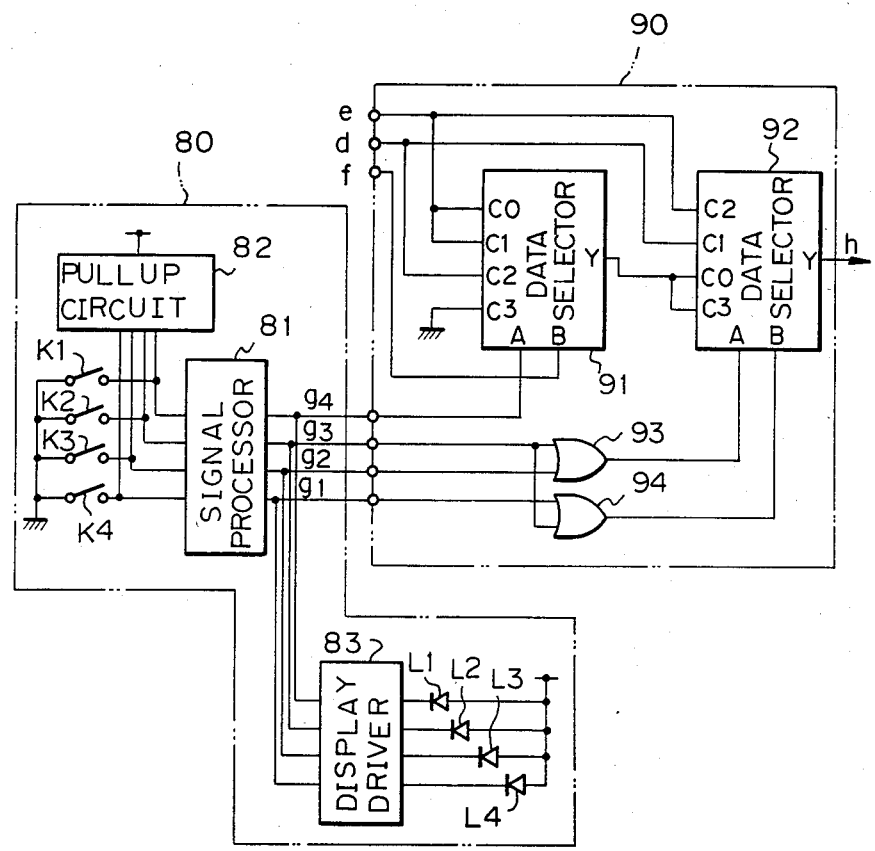
FIG. 15 is a circuit diagram showing specific constructions of an operation control section and an output control section.

Referring to FIG. 15, specific constructions of the operation control 80 and output control 90 (see FIG. 3) are shown. The operation control 80 comprises the mode keys K1, K2, K3 and K4, a signal processing circuit 81, a pullup circuit (resistor) 82, a display driver 83, and the display lamps L1, L2, L3 and L4. Reading statuses of the mode keys K1-K4, the signal processor 81 produces mode signals g1, g2, g3 and g4. When the mode key K1 is turned on, the mode signals g1, g2, g3 and g4 become respectively a ONE, a ZERO, a ZERO and a ZERO; when the mode key K2 is turned on, they respectively become a ZERO, a ONE, a ZERO and a ZERO; when the mode key K3 is turned on, they respectively become a ZERO, a ZERO, a ONE and a ZERO; when the mode key K4 is turned on, they respectively become a ZERO, a ZERO, a ZERO and a ONE. While none of the mode keys are depressed, the mode signals maintain their previous statuses. In an initialized condition, the mode signals g1, g2, g3 and g4 are a ONE, a ZERO, a ZERO and a ZERO, respectively.

The display driver 83 energizes the display lamps L1, L2, L3 and L4 depending upon the statuses of the mode signals g1-g4. Specifically, if the mode signals g1, g2, g3 and g4 respectively are a ONE, a ZERO, a ZERO and a ZERO, the display driver 83 energizes the display lamp L1; if they respectively are a ZERO, a ONE, a ZERO and a ZERO, the display driver 83 energizes the display lamp L2; if they respective are a ZERO, a ZERO, a ONE and a ZERO, the display driver 83 energizes the display lamp L3; and if they respectively are a ZERO, a ZERO, a ZERO and a ONE, the display driver 83 energizes the display lamp L4. The mode signals g1-g4 from the operation control 80 are applied to the output control 90.

The output control 90, as also shown in FIG. 15, comprises data selectors 91 and 92, and OR gates 93 and 94. Each of the data selectors 91 and 92 is constructed to select an input terminal C0 thereof if both selection control terminals A and B are ZEROs, an input terminal C1 if they are a ONE and a ZERO, an input terminal C2 if they are a ZERO and a ONE, and an input terminal C3 if they are ONEs. A signal appearing at the selected input terminal is delivered from an output terminal Y. Applied to the input terminals C0, C1 and C2 of the data selector 91 are the signals (e), (e) and (d) and a fixed level L (ZERO), respectively. The data selector 92 receives the signals (e) and (d) at the input terminals C1 and C2 and a signal selected by the data selector 91 at the input terminals C0 and C3.

In the above construction, the output signal (h) of the output control 90 changes its content as shown in Table below.

TABLE

| | KIND OF DOCUMENT IMAGE | |
|---|---|---|
| OP MODE | halftone image (f = 1) | two-level image (f = 0) |
| 1 | same as signal (e) | same as signal (e) |
| 2 | same as signal (d) | same as signal (d) |
| 3 | same as signal (d) | same as signal (e) |

| | TABLE-continued | |
|---|---|---|
| | KIND OF DOCUMENT IMAGE | |
| OP MODE | halftone image (f = 1) | two-level image (f = 0) |
| 4 | low level L | same as signal (e) |

In the above Table, the operation (OP) modes 1, 2, 3 and 4 represent the character mode (g1, g2, g3, g4=ONE, ZERO, ZERO, ZERO), the photograph mode (g1, g2, g3, g4=ZERO, ONE, ZERO, ZERO), the automatic selection mode (g1, g2, g3, g3=ZERO, ZERO, ONE, ZERO), and the magic erase mode (g1, g2, g3, g4=ZERO, ZERO, ZERO, ONE), respectively.

Specifically, when the mode key K1 is depressed to select the character mode, image data are simply binarized with respect to the fixed threshold TH1 disregarding the distinction between halftone images and others. The resulting signal (e) is applied to the printer as image data. When the mode key K2 is depressed to select the photograph mode, image data are subjected to halftone processing which uses the submatrix method, again regardless of the distinction between the kinds of images. The resulting data (d) is applied as image data to the printer.

When the mode key K3 is depressed to specify the automatic selection mode, whether document images include halftone information is determined. Responsive to a signal (f) which is representative of a result of the decision, image signals are selectively delivered to the printer, that is, a halftone-processed signal (d) for a halftone image and a simple binary signal (e) for a two-level image. Concerning mesh-printed images, they are decided to carry halftone information as previously described and, therefore, halftone processed, even if they are characters and the like.

Further, when the mode key K4 is depressed to select the magic erase mode, whether document images contain halftone information is decided. Again, responsive to the signal (f) representative of a result of the decision, signals are selectively applied to the printer, that is, a low level L signal, or white pixel level signal, if halftone information is absent and a simple binary signal if halftone information is absent.

Figure 16A:
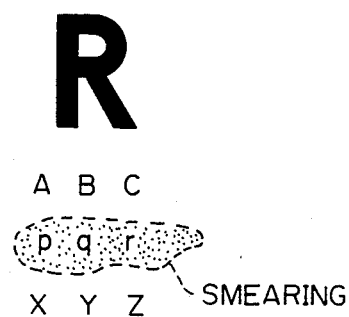
FIG. 16a is a plan view showing exemplary images carried in a document.
Figure 16B:
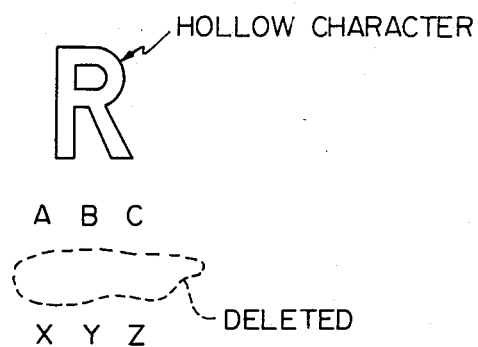

The operation in the magic erase mode will be described in detail. In this particular mode operation, in a region which is determined to contain halftone information, all the pixels are replaced with signals which are indicative of white pixels (low level L) and then applied to the printer. This deletes all the pixels which belong to a halftone region. In the other regions which are decided to contain no halftone information, simple binary signals are delivered to the printer. In practice, the magic erase mode derives the following unprecedented capabilities. As shown in FIG. 16a, assume that a document carries images which include three strings of characters "ABC", "pqr" and "XYZ" which are printed in relatively thin lines, and a character "R" which is printed in relatively thick lines. To delete the characters "pqr", for example, what is required is simply smearing out that region by means of a felt pen or the like. Although the characters "pqr" are originally two-level images, smearing them out causes the spacings between the characters to be colored so that the particular region as a whole is regarded as a relatively wide halftone region. This is decided by the first subsection 71 of the image decision section 70. As previously stated, where a density above the threshold TH2 is distributed throughout a region which is dimensioned greater than a predetermined size (7×7 matrix), the decision subsection 71 determines such a region as a halftone region. For a region which is regarded as a halftone region, white pixels are recorded (non-recording) with no regard to the content and density of document images ("pqr" in this example). Hence, the characters "pqr" and its neighborhood which are smeared out are deleted. In the meantime, the other characters "ABC" and "XYZ" are processed as two-level images to appear in a reproduction (see FIG. 16b).

As egards the bold character "R", the magic erase mode deletes it except for the contour without resorting to smearing. Specifically, because a region greater than a predetermined size is decided as a halftone region, the region printed in bold lines is regarded as a halftone region and, therefore, deleted as mentioned. However, each contour portion of the bold lines, i.e., a portion which extends from each pixel located at the outermost position of each line to the sixth pixel in each of the x and y directions is decided to be a two-level region. These particular portions which are determined to be two-level regions are each processed with respect to two levels, the results being delivered as image signals. This allows only the contour portions of the character "R" to appear black in a reproduction (see FIG. 16b). In short, in the magic erase mode operation, all the characters which are printed in bold lines are transformed hollow characters (or patterns) which have contours only.

The portion which is smeared out in a light color as previously mentioned, too, has contour portions thereof processed as two-level regions. However, so long as the density of the color is lower than the threshold TH1, the result of binary processing is white pixels. That is, the contour of the smeared region can also be deleted if the writing implement used for smearing is light in color. Further, characters written in a document in a light color by means of a felt pen or the like will be entirely deleted.

The hollow reproduction attainable with the magic erase mode as discussed above is applicable not only to characters but also to symbols, lines, figures, paintings and other patterns which have boldness greater than a predetermined one. Since in this particular embodiment the contours which are not deleted are recorded based on binary image signals and, in addition, their width is uniform (six pixels in each of the x and y directions), they appear clear-cut in a copy without blurring.

Some approaches have been proposed to attain hollow patterns in copies as described above. The prior art approaches, whether they be optical, electrical or logical, produce a blurred image and a sharp image and use OR of the two different kinds of images. This, however, has various drawbacks such a blurring of hollow patterns, rounding of the corners of hollow patterns, fatting of images, and damaging small patterns. Another approach known in the art consists in binarizing an image signal with respect to a high and a low thresholds to provide two discrete signals and, then, providing OR of the two signals. The problems with this kind of approach are that boldness is apt to differ from one line to another, that images become fat, etc. Further, the problem commonly observed with the above two prior art approaches is that due to the use of exclusive-OR even thin lines as well as characters, FIGURES and others made up of thin lines are undesirably made hollow and, moreover, the resulting hollow images have lines which are bolder than those of a document. In short, all the prior art schemes are rather close to trimming.

In contrast, the illustrative embodiment applies hollowing only to those images which have boldness greater than a predetermined one, while leaving thin lines which do not need hollowing as they are. The reproduced pattern is equally dimensioned as the pattern in a document because the contour of the latter appears in a reproduction. In addition, hollow images attainable with the embodiment are free from blurring and rounding of the corners of patterns. It is to be noted that in this particular embodiment the boldness of the lines which constitute a contour is variable as desired by modifying the construction (number) of pixels which are processed by the first decision subsection 71.

Figure 17B:
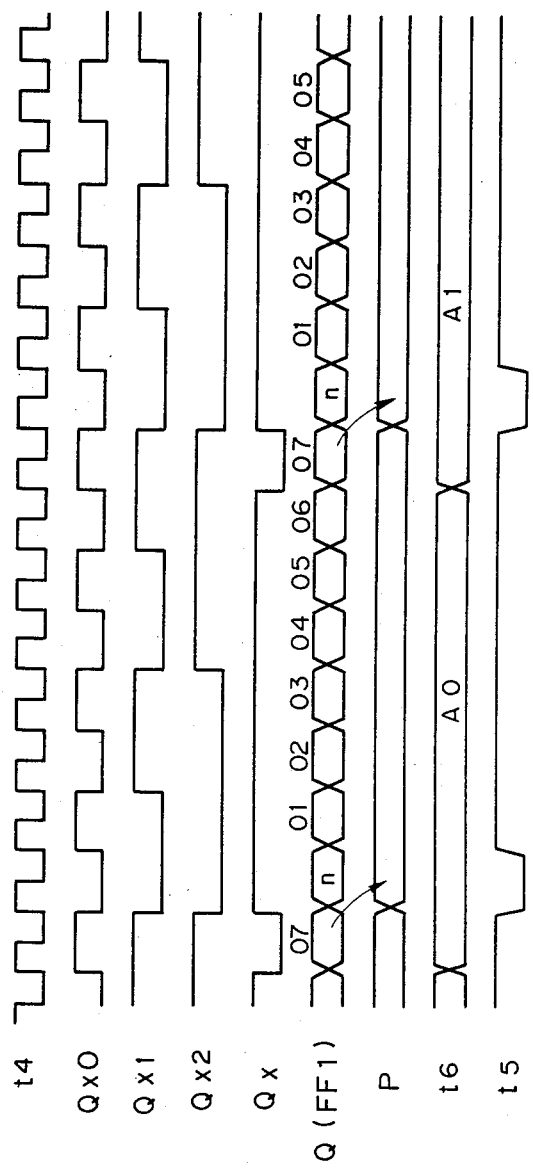

Referring to FIG. 17a, modifications to the mesh detector and first area detector are shown. The operation timing of the modified first area detector 170B is shown in FIG. 17b. The mesh detector 160B is identical in construction with the fourth mesh detector MS4 which is shown in FIG. 9b.

In the first area detector 170B, the function of generating the signal Qx is assigned to a gate 171 and that of generating the signal Qy to a gate 172. Applied to three input terminals of the gate 171 are lower three bits Qx0, Qx1 and Qx2 of a signal which is indicative of an x direction pixel-by-pixel position. Applied to three input terminals of the gate 172 are lower three bits Qy0, Qy1 and Qy2 of a signal indicative of a y direction pixel-by-pixel position. In this construction, the signal Qx becomes low level L for one pixel per eight pixels which are contiguous in the x direction, while remaining high level H during the other periods. Likewise, the signal Qy becomes low level L for one pixel per eight pixels which are contiguous in the y direction, while remaining high level H during the other periods. In this modification, therefore, the detection condition assigned to the mesh detector is fixed and each first area has a fixed 8×8 pixel matrix.

In the illustrative embodiment, the operation mode is unchanged unless any of the mode keys K1–K4 is depressed to select another particular mode. Alternatively, an arrangement may be made such that modes are programable through ten keys, for example, for various document scanning positions. Such will allow a controller to automatically change the mode at each of the scanning positions while reading a document.

Further, in the magic erase mode, the embodiment is so constructed as to delete those portions which are determined to be halftone regions and record the other portions which are determined to be two-level image regions. If desired, however, only those portions decided to be halftone regions may be recorded, in which case in each portion decided to be a halftone region the halftone-processed signal may be replaced with the simple binary signal. Such will prevent a portion smeared out with a felt pen or the like from appearing in a copy. This kind of modification allows only a smeared portion to be selectively reproduced. What is necessary for such a modification to be implemented is only modifying the interconnection between the input terminals of the data selector 91 shown in FIG. 15 and the signal lines.

In summary, it will be seen that the present invention achieves various unprecedented advantages as enumerated below.

(1) Halftone images such as photographs and two-level images such as characters which are carried in a single document can each be reproduced with clear-cut appearance.

(2) A halftone processing mode, a two-level processing mode, and an automatic halftone/two-level selection mode can be selectively set up as desired, so that various kinds of documents are reproducible with high quality.

(3) Any desired part of images in a document can readily be omitted in a reproduction, so that various unique kinds of image processing are attainable such as deleting a character except for its contour.

(4) Moire is eliminated because mesh images are subjected to halftone processing.

(5) The decision accuracy is high due to different kinds of decision circuit adapted for decision of presence/absence of halftone information.

(6) The magnification is variable with hardly any error because the content of processing assigned to the decision circuitry is variable depending upon the magnification.

Various modifications will become possible for those skilled in the art after receiving the teachings of the present disclosure without departing from the scope thereof.

What is claimed is:

1. A device for deciding a particular kind of image region to which a pixel of a document image to be processed belongs, comprising:
   binarizer means for binarizing multi-level quantized digital image information associated with the document image using a second threshold level which is different from a first threshold level used for binarization of two-level image areas;
   shift means for shifting the data binarized by using the second threshold level by a predetermined number of pixels in at least one of a main scanning and a subscanning directions in which a document is scanned;
   AND means for providing an AND function of the shifted data and the binarized data; and
   decision means for deciding responsive to the AND function a particular image region to which a pixel of a document image to be processed belongs.

2. A device as claimed in claim 1, wherein said decision means is constructed to determine that the pixel to be processed belongs to a first image region when the AND is a ONE and to a second region when the AND is a ZERO.

3. A device as claimed in claim 2, wherein the decision means is further constructed to provide the second threshold level with a hysteresis characteristic which is variable with data which is binarized with respect to the second threshold level.

4. A device as claimed in claim 2, wherein the first image region comprises a halftone image region and the second image region, a two-level image region.

5. A device as claimed in claim 2, further comprising processor means for processing an edge portion of the first image region as the first image region when simple binarized data associated with the edge portion is a ZERO and as the second image region when the simple binarized data is a ONE.

6. A device as claimed in claim 5, wherein the first image region comprises a halftone image region and the second image region, a two-level image region.

7. A device as claimed in claim 1, wherein the decision means is constructed to provide the second threshold level with a hysteresis characteristic which is variable with data which is binarized with respect to the second threshold level.

8. A device as claimed in claim 1, further comprising mesh detector means for determining whether black level pixels or white level pixels of a document image are arranged in a mesh and, if in a mesh, deciding that the image includes a halftone image region.

9. A device as claimed in claim 8, wherein said mesh detector means comprisess serial-to-parallel converter means for simultaneously and parallelly outputting signals associated with a plurality of pixels which neighbor each other in the main scanning and the subscanning directions, pixel detector means for processing the plurality of parallel output signals of said serial-to-parallel converter means to decide, for each of the signals associated with the pixels, whether a particular observed pixel and pixels surrounding the observed pixel are arranged in a mesh pattern, and first area detector means for processing an output signal of said pixel detector means to decide at least one of presence/absence and a number of pixels in a first area, which includes a plurality of pixels, in which a mesh pattern is detected.

10. A device as claimed in claim 9, wherein the mesh detector means further comprises second area detector means for processing an output signal of said first area detector means to determine presence/absence of a mesh pattern in each of second areas each comprising a plurality of the first areas.

11. A device as claimed in claim 9, wherein the decision means is constructed to adjust a parameter associated with at least one of the pixel detector means and the first area detector means responsive to a selected magnification of an image to be recorded.

12. A digital copier for reproducing an image carried in a document by converting the document image to an electrical binary or recording/non-recording signal and recording the signal, comprising:
(a) image reader means for scanning the document image to produce an electrical signal representative of an image density for each of a multiplicity of small regions of the image;
(b) halftone processor means for processing the electrical output signal of said image reader means to produce as an output signal a binary signal associated with a halftone image which corresponds to the level of the electrical signal;
(c) binarizer means for processing the electrical output signal of the image reader means to compare the level of the electrical signal and a predetermined fixed reference level and produce as an output signal a binary signal which is associated with a relationship between the two compared levels;
(d) image region decision means for processing the electrical output signal of the image reader means to decide whether the document image includes a halftone image region, including mesh detector means for deciding whether black level pixels or white level pixels of the document image are arranged in a mesh and, if in a mesh, deciding that a halftone image region is present;
(e) recorder means for recording binary data on a predetermined recording medium responsive to a signal which is applied thereto; and
(f) control means for applying to said recorder means the output signal of the halftone processor means when the image region decision means decides that a halftone image region is present and the output signal of the binarizer means when the image region decision means decides that a halftone image region is absent.

13. A digital copier as claimed in claim 12, wherein said mesh detector means comprises serial-to-parallel converter means for simultaneously outputting signals associated with a plurality of pixels which neighbor each other in each of a main scanning and a subscanning directions of the image reader means, pixel detector means for processing a plurality of output signals of said serial-to-parallel converter means to decide, for each of the signals associated with the pixels, whether a particular observed pixel and pixels surrounding the observed pixel are arranged in a mesh pattern, and first area detector means for processing an output signal of said pixel detector means to decide at least one of presence/absence and a number of pixels in a first area, which includes a plurality of pixels, in which a mesh pattern is detected.

14. A digital copier as claimed in claim 13, wherein the mesh detector means further comprises second area detector means for processing an output signal of said first area detector means to decide presence/absence of a mesh pattern in each of second areas each comprising a plurality of the first areas.

15. A digital copier as claimed in claim 14, wherein the second area comprises a plurality of the first areas which are arranged one after another in each of the main scanning and the subscanning directions.

16. A digital copier as claimed in claim 14, wherein the second area detector means is constructed to output a signal representative of presence of a mesh pattern when more than a predetermined number of the first areas which constitute one of the second areas are decided to contain a mesh pattern.

17. A digital copier as claimed in claim 14, wherein the mesh detector means further comprises third area detector means for processing an output signal of the second area detector means to decide presence/absence of a mesh pattern in each of third areas each comprising a plurality of the first areas.

18. A digital copier as claimed in claim 17, wherein each of the third areas comprises a plurality of the first areas which are arranged one after another in each of the main scanning and the subscanning directions.

19. A digital copier as claimed in claim 17, wherein the third area detector means is constructed to output a signal representative of presence of a mesh pattern when more than a predetermined number of the first areas which constitute one of the third areas are decided to contain a mesh pattern.

20. A digital copier as claimed in claim 14, wherein the image region decision means comprises size decision means for producing a binary signal by comparing a level of the electrical output signal of the image reader with a predetermined second reference level, which is associated with a density level lower than the reference level assigned to the binarizer means, and deciding that a halftone image region is present when more than a predetermined number of pixels in each of which the binary signal is indicative of a level corresponding to black of the document image appear continuously in each of the main scanning and the subscanning directions.

21. A digital copier as claimed in claim 13, wherein the image region decision means is constructed to adjust a parameter associated with at least one of the pixel detector means and the first area detector means responsive to a magnification of an image to be recorded.

22. A digital copier for reproducing an image carried in a document by converting the image to an electrical binary or recording/non-recording signal and recording the signal, comprising:
  (a) image reader means for scanning the document image to produce an electrical signal for each of a multiplicity of small regions of the image which is associated with an image density of the region;
  (b) halftone processor means for processing the electrical output signal of said image reader means to produce as an output signal a binary signal associated with a halftone image which corresponds to the level of the electrical signal;
  (c) binarizer means for processing the electrical output signal of the image reader means to compare the level of the electrical signal with a predetermined fixed reference level and produce as an output signal a binary signal representative of a relation between the two compared levels:
  (d) image region decision means having first decision means for deciding whether the document image includes a halftone image region responsive to a binary signal which is produced by testing the level of the electrical output signal of the image reader means with respect to a first threshold level, and a second decision means for deciding whether the document image includes a halftone image region responsive to a binary signal which is produced by testing the level of the electrical output signal of the image reader means with respect to a second threshold level, which is different from the first threshold level;
  (e) recorder means for recording binary data in a predetermined recording medium responsive to a signal applied thereto; and
  (f) control means for applying one of the output signal of the halftone processor means, the output signal of the binarizer means and a signal having a predetermined level to said recorder means responsive to the decision made by the image region decision means.

23. A digital copier as claimed in claim 22, wherein the first threshold level comprises the fixed reference level of the binarizer means, while the second threshold level comprises a level which is lower than the first threshold level in terms of density.

24. A digital copier as claimed in claim 23, wherein the first decision means is constructed to detect whether black level pixels or white level pixels of the document image are arranged in a mesh and, if in a mesh, decide that a halftone image region is present.

25. A digital copier as claimed in claim 24, wherein the first decision means comprises serial-to-parallel converter means for simultaneously outputting signals associated with a plurality of pixels which neighbor each other in each of the main scanning and the subscanning directions, pixel detector means for processing a plurality of signals outputted by said serial-to-parallel converter means to decide, for each of the pixels, whether a particular observed pixel and pixels surrounding the observed pixel are arranged in a mesh pattern, and first area detector means for processing an output signal of the pixel detector means to decide at least one of presence/absence and a number of pixels in a first area, which includes a plurality of pixels, in which a mesh pattern is detected.

26. A digital copier as claimed in claim 25, wherein the first decision means further comprises second area detector means for processing an output signal of the first area detector means to decide presence/absence of a mesh pattern in each of second areas each comprising a plurality of the first areas.

27. A digital copier as claimed in claim 26, wherein the first decision means further comprises third area detector means for processing an output signal of the second area detector means to decide presence/absence of a mesh pattern in a third area which comprises a plurality of the first areas.

28. A digital copier as claimed in claim 23, wherein the second decision means is constructed to process a binary signal produced by deciding with respect to the second threshold level and decide that a halftone image region is present when more than a predetermined pixels each indicative of a level associated with black of the document image appear continuously in each of the main scanning and the subscanning directions.

29. A digital copier as claimed in claim 22, wherein the control means is constructed to in a first operation mode applies an output signal of the halftone processor means to the recorder means when the image region decision means decides that a halftone image region is present and an output signal of the binarizer means to the recorder means when the image region decision means decides that a halftone image region is absent and, in a second operation mode, applies a signal having a predetermined level to the recorder means when the image region decision means decides that a halftone image region is present and an output signal of the binarizer means to the recorder means when the image region decision means decides that a halftone image region is absent.

30. A digital copier as claimed in claim 22, wherein the predetermined level corresponds to a white level of an image.

31. A digital copier for reproducing an image carried in a document by converting the image to an electrical binary or recording/non-recording signal and recording the signal, comprising:
  (a) image reader means for scanning the document image to produce an electrical signal for each of a multiplicity of small regions of the image which is associated with an image density of the small region;
  (b) halftone processor means for processing the electrical output signal of said image reader means to produce as an output signal a binary signal associated with a halftone image which is associated with the level of the electrical signal;
  (c) binarizer means for processing the electrical output signal of the image reader means to compare the level of the electrical signal with a predetermined fixed reference level and produce as an output signal a binary signal representative of a relationship between the two compared levels;
  (d) image region decision means for processing the electrical output signal of the image reader means to decide whether the document image includes a halftone image region;
  (e) recorder means for recording binary data in a predetermined recording medium responsive to a signal applied thereto;

(f) operation mode selector means for selecting a desired operation mode; and (g) control means for selecting one of the output signal of the halftone processor means and the output of the binarizer means depending upon an operation mode selected by said operation selector means and applying the selected signal to the recorder means.

32. A digital copier as claimed in claim 31, wherein the control means is constructed to deliver one of an output signal of the halftone processor means, an output signal of the binarizer means and a binary signal having a predetermined level to the recorder means depending upon an operation mode selected by the operation mode selector means and a result of decision made by the image region decision means.

33. A digital copier as claimed in claim 32, wherein the control means is further constructed to, if the selected operation mode is a first mode, applies an output signal of the halftone processor means when the result of decision is presence of a halftone image region and an output signal of the binarizer processor means when the result of decision is absence of a halftone image region and, if the selected operation mode is a second mode, applies the binary signal having the predetermined level when the result of decision is presence of a halftone image region and an output signal of the binarizer means when the result of decision is absence of a halftone image region.

34. A digital copier as claimed in claim 33, wherein the binary signal having the predetermined level corresponds to a white level of the document image.

35. A digital copier as claimed in claim 32, wherein the image region decision means comprises first decision means for producing a binary signal by comparing a level of the electrical output signal of the image reader means with a second reference level which is lower in density level than the fixed reference level of the binarizer means and, when more than a predetermined number of pixels in which the binary signal is indicative of a level corresponding to black of the document image appear continuously in each of the main scanning and the subscanning directions, deciding that a halftone image region is present.

36. A digital copier as claimed in claim 35, wherein the image region decision means further comprises second decision means for detecting whether black level pixels or white level pixels of the document image are arranged in a mesh and, if in a mesh, deciding that a halftone image region is present.

37. A digital copier as claimed in claim 36, wherein the second decision means comprises serial-to-parallel converter means for simultaneously producing signals associated with a plurality of pixels which neighbor each other in each of the main scanning and the subscanning directions, pixel detector means for processing a plurality of output signals of said serial-to-parallel converter means to decide, for each of the signals associated with the pixels, whether a particular observed pixel and pixels surrounding the observed pixel are arranged in a mesh pattern, and area detector means for processing an output signal of said pixel detector means to decide at least one of presence/absence and a number of pixels in a predetermined area in which a mesh pattern is detected.

38. A digital copier as claimed in claim 31, wherein the control means is constructed to, when the operation mode selector means selects a first operation mode, applies an output signal of the halftone processor means to the recorder means and, when the operation mode selector means selects a second operation mode, applies an output signal of the binarizer means to the recorder means and, when the operation mode selector means selects a third operation mode, applies one of an output signal of the halftone processor means and an output of the binarizer means to the recorder means depending upon a result of decision made by the image region decision means.

39. A digital copier as claimed in claim 38, wherein the control means is constructed to, when the third operation mode is selected, applies to the recorder means an output signal of the halftone processor means when a result of decision of the image region decision means is presence of a halftone image region and an output signal of the binarizer means when the result is absence of a halftone image region.

40. A digital copier as claimed in claim 38, wherein the image region decision means comprises first decision means for producing a binary signal by comparing a level of the electrical output signal of the image reader means with a second reference level which is lower in density level than the fixed reference level of the binarize means and, when more than a predetermined number of pixels in which the binary signal is indicative of a level corresponding to black of the document image appear continuously in each of the main scanning and the subscanning directions, deciding that a halftone image region is present.

41. A digital copier as claimed in claim 40, wherein the image region decision means further comprises second decision means for detecting whether black level pixels or white level pixels of the document image are arranged in a mesh and, if in a mesh, deciding that a halftone image region is present.

42. A digital copier as claimed in claim 41, wherein the second decision means comprises a serial-to-parallel converter for simultaneously outputting signals associated with a plurality of pixels which neighbor each other in each of the main scanning and the subscanning directions, pixel detector means for processing a plurality of output signals of said serial-to-parallel converter means to decide, for each of the signals associated with the pixels, whether a prticular observed pixel and pixels surrounding the observed pixel are arranged in a mesh pattern, and area detector means for processing an output signal of said image detector means to decide at least one of presence/absence and a number of pixels in a predetermined area, which includes a plurality of pixels, in which a mesh pattern is detected.

43. A digital copier as claimed in claim 38, wherein the control means is further constructed to when a fourth operation mode is selected by the operation mode selector means, applies one of an output signal of the halftone processor means and a signal having a predetermined level to the recorder means depending upon a result of decision made by the image region decision means.

44. A digital copier as claimed in claim 43, wherein the control means is constructed to, when the third mode is selected, apply to the recorder means an output signal of the halftone processor means when a result of decision made by the image region decision means is presence of a halftone image region and an output signal of the binarizer means when the result of decision is absence of a halftone image region and, when the fourth mode is selected, applies to the recorder means the binary signal having the predetermined level when the result of decision is presence of a halftone image region and an output signal of the binarizer means when the result of decision is absence of a halftone image region.

45. A digital copier as claimed in claim 44, wherein the binary signal having the predetermined level corresponds to a white level of the document image.

46. A digital copier as claimed in claim 43, wherein the image region decision means comprises first decision means for producing a binary signal by comparing a level of the electrical output signal of the image reader means with a second reference level which is lower in density level than the fixed reference level of the binarizer means and, when more than a predetermined number of pixels in which the binary signal is indicative of a level corresponding to black of the document image appear continuously in each of the main scanning and the subscanning directions, deciding that a halftone image region is present.

47. A digital copier as claimed in claim 46, wherein the image region decision means further comprises second decision means for detecting whether black level pixels or white level pixels of the document image are arranged in a mesh and, if in a mesh, deciding that a halftone image region is present.

48. A digital copier as claimed in claim 47, wherein the second decision means comprises serial-to-parallel converter means for simultaneously producing signals associated with a plurality of pixels which neighbor each other in each of the main scanning and the subscanning directions, image detector means for processing a plurality of output signals of said serial-to-parallel converter means to decide, for each of the signals associated with the pixels, whether a particular observed pixel and pixels surrounding the observed pixel are arranged in a mesh pattern, and area detector means for processing an output signal of said image detector means to decide at least one of presence/absence and a number of pixels in a predetermined area, which includes a plurality of pixels, in which a mesh pattern is detected.

* * * * *